(12) United States Patent
Fujiwara et al.

(10) Patent No.: US 7,830,953 B2
(45) Date of Patent: Nov. 9, 2010

(54) RECEIVING APPARATUS, COMMUNICATION APPARATUS AND CONTROL APPARATUS USING THE SAME

(75) Inventors: Ryosuke Fujiwara, Kodaira (JP); Tatsuo Nakagawa, Hachioji (JP); Masayuki Miyazaki, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 934 days.

(21) Appl. No.: 11/598,687

(22) Filed: Nov. 14, 2006

(65) Prior Publication Data

US 2007/0116104 A1    May 24, 2007

(30) Foreign Application Priority Data

Nov. 18, 2005    (JP)    ............... 2005-333670

(51) Int. Cl.
*H04B 1/06* (2006.01)
(52) U.S. Cl. .................. 375/149; 375/343; 375/355
(58) Field of Classification Search ............... 375/148, 375/149, 152, 343, 354
See application file for complete search history.

(56) References Cited

U.S. PATENT DOCUMENTS

| 6,967,993 | B1 * | 11/2005 | Miller ............... 375/150 |
| 2002/0172262 | A1 | 11/2002 | Sugaya et al. ............ 375/130 |
| 2005/0018750 | A1 * | 1/2005 | Foerster et al. ............ 375/130 |
| 2006/0008035 | A1 * | 1/2006 | Larsson ............... 375/343 |

FOREIGN PATENT DOCUMENTS

| JP | 2002-335189 | 11/2002 |
| JP | 2002-335228 | 11/2002 |

OTHER PUBLICATIONS

M. Win, "Impulse Radio: How It Works," IEEE Communications Letters, vol. 2, No. 2, Feb. 1998, pp. 36-38.
R. Fujiwara et al, "Rapid Signal Acquisition for Low-Rate Carrier-Based Ultra-Wideband Impulse Radio," ISCAS205 Proc., May 2005, pp. 4497-4500.

* cited by examiner

*Primary Examiner*—Shuwang Liu
*Assistant Examiner*—David Huang
(74) *Attorney, Agent, or Firm*—Miles & Stockbridge P.C.

(57) ABSTRACT

The present invention conducts the initial synchronization acquisition of the rapid and high precision ultra-wideband signal without complicatedness of hardware and increase in power consumption. For this purpose, a communication apparatus for exchanging information with an intermittent pulse train signal searches all phases among the pulses in the predetermined search resolution in the process to acquire initial synchronization of the input pulse, estimates the region where the peak phase of the largest output value exists, narrows the region where the peak phase exists up to the predetermined range by repeating the search for all phases in the estimated region in the next step, and conducts acquisition of detailed synchronization in the estimated region. In every step, the threshold value for judging existence of signal or a gain in the analog circuit is controlled for each step. Moreover, the search resolution is set coarse for estimation of the peak phase and set fine for acquisition of detailed synchronization.

18 Claims, 27 Drawing Sheets

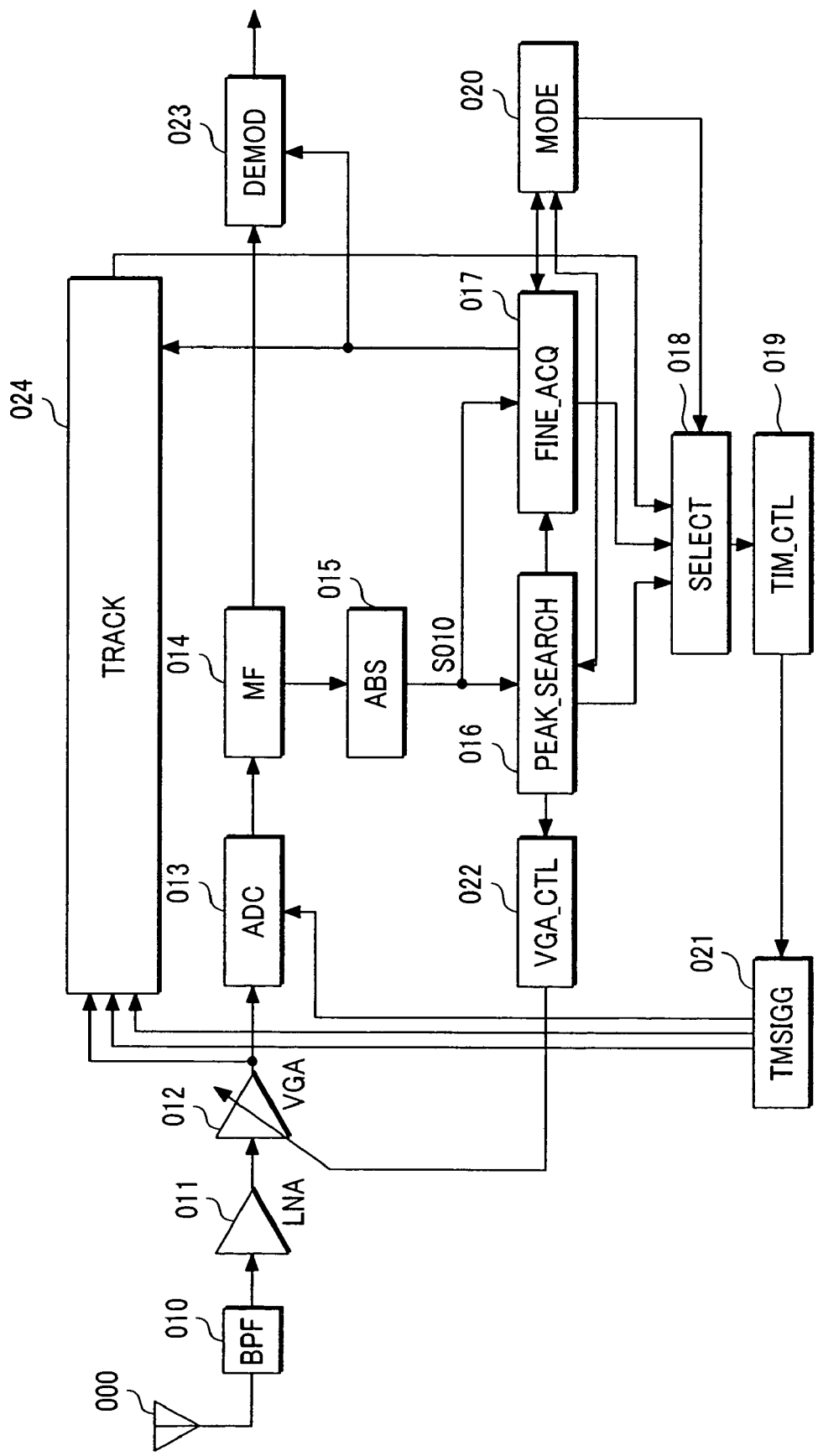

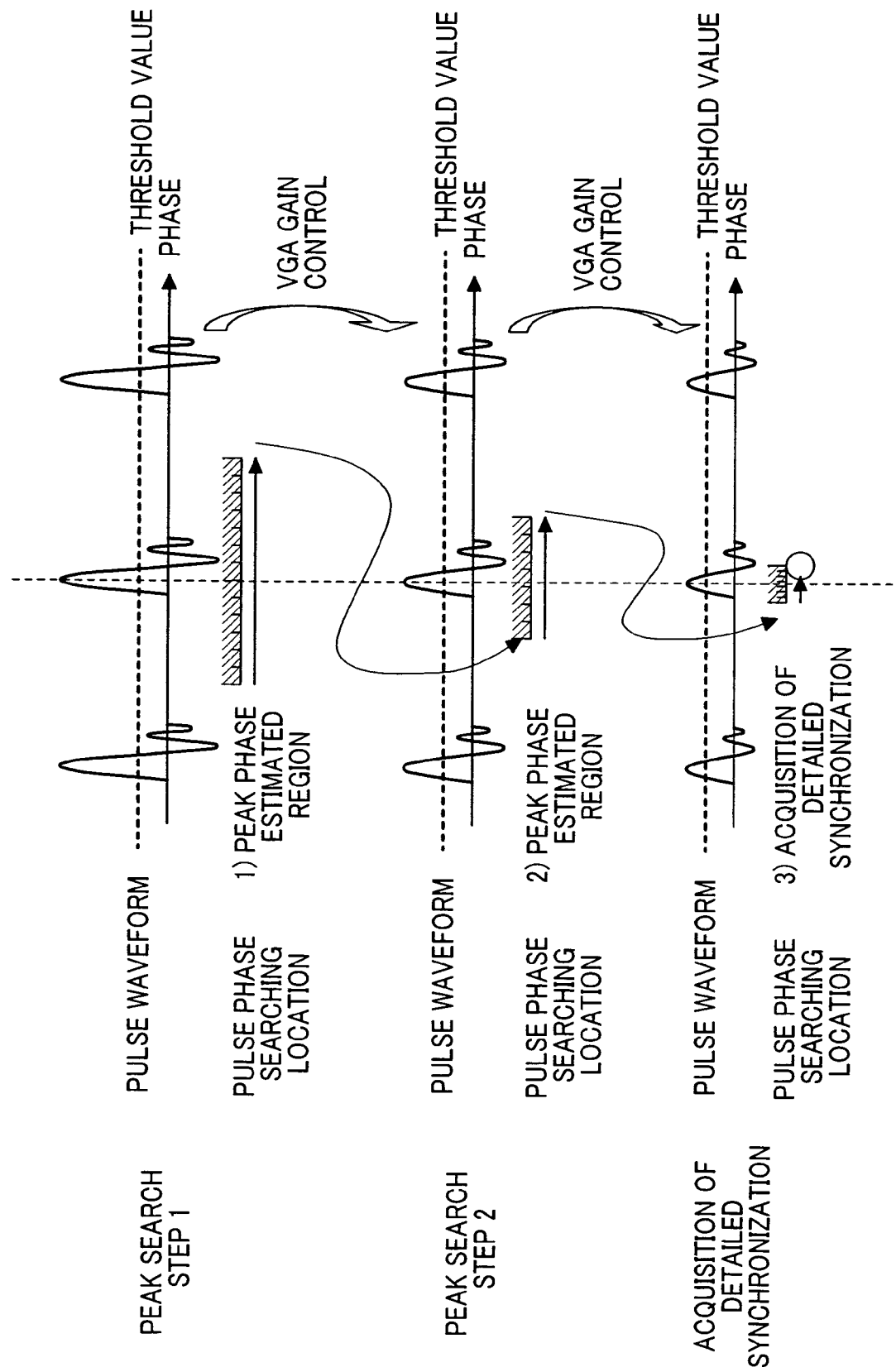

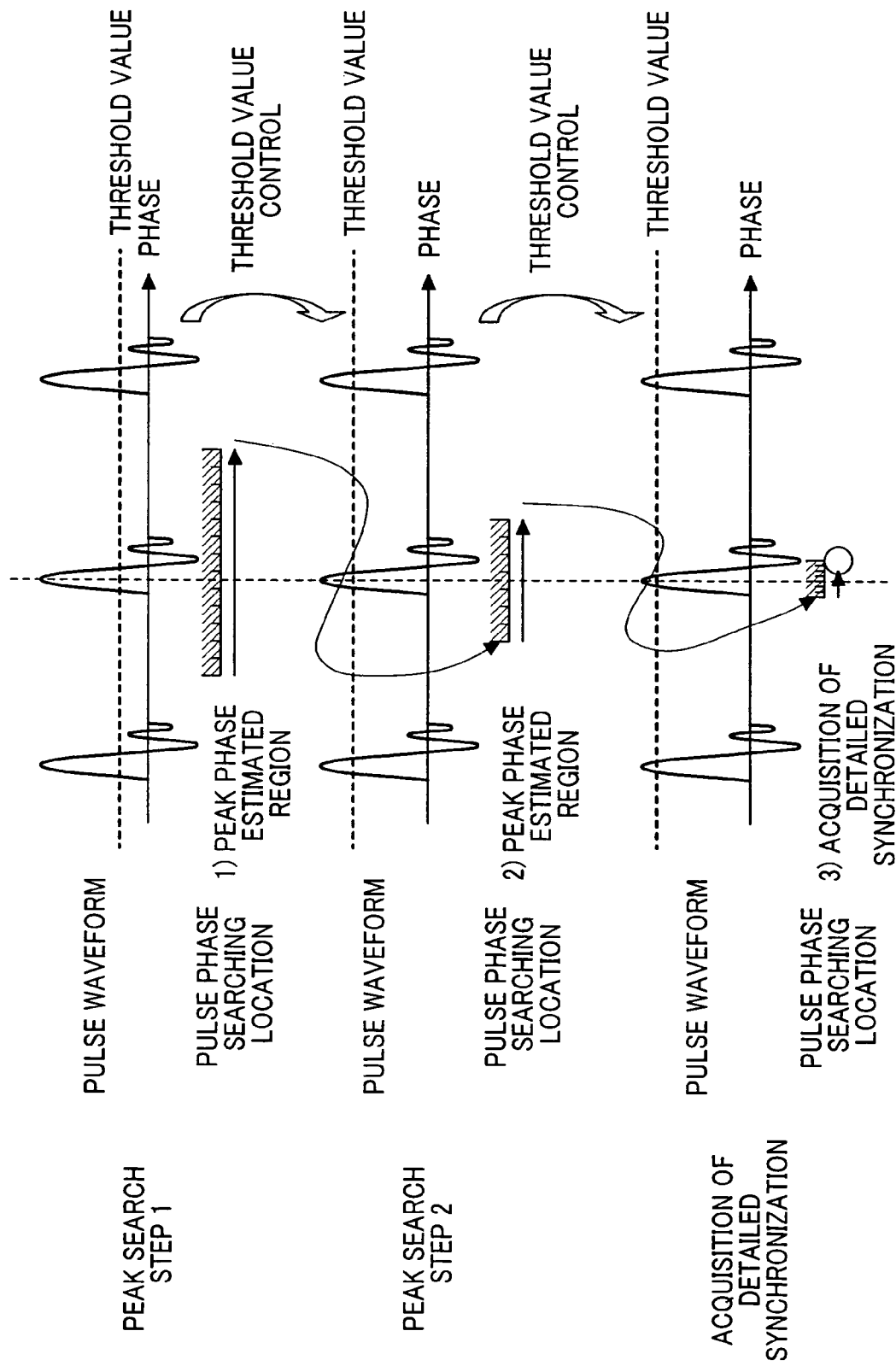

N(n) : NUMBER OF TIMES OF PHASE SEARCH OF n-TH STEP

M(n) : RANGE OF ESTIMATED REGION OF n-TH STEP

STEP : NUMBER OF TIMES OF ESTIMATIONS OF PEAK PHASE

RECEIVING APPARATUS, COMMUNICATION APPARATUS AND CONTROL APPARATUS USING THE SAME

CLAIM OF PRIORITY

The present application claims priority from Japanese application JP 2005-333670 filed on Nov. 18, 2005, the content of which is hereby incorporated by reference into this application.

FIELD OF THE INVENTION

The present invention relates to a receiving apparatus, a communication apparatus to form a communication system using an intermittent pulse train spread by spread code as the transmitting signal, and a control apparatus using the same and particularly to an ultra-wideband signal receiving apparatus and a communication apparatus provided with an initial signal acquisition apparatus for the same transmitting signal and a control apparatus using the same.

BACKGROUND OF THE INVENTION

In recent years, a radio terminal such as a mobile phone and a wireless LAN (Local Area Network) is remarkably spreading and the frequency band used is also extending up to GHz band. Therefore, it is now difficult to find out new frequency bands to be used. In the background explained above, attention is now focused on the communication systems using impulse trains formed of pulses having extremely narrow pulse width (f or example, about 1 ns) which have been proposed as the novel methods to use the frequency resources. Such communication system using the pulse trains include, for example, an Ultra-Wideband Impulse Radio (hereinafter, referred to as "UWB-IR") communication system. As an example of this communication system, the UWB-IR communication system wherein the Gaussian mono-pulse is modulated with the PPM (Pulse Position Modulation) system is disclosed in "Impulse Radio: How It Works" by Moe Z. Win, IEEE Communications Letters, Vol. 2, No. 2, pages 36 to 38 (February 1998).

Moreover, as a modulation system in the UWB-IR communication system, the direct sequence spread spectrum for spreading pulse trains with the spread code is employed. In this case, a plurality of spread pulses correspond to one data value. An example of the direct sequence spread spectrum type UWB-IR communication apparatus is disclosed in Japanese Patent Laid-Open Nos. 2002-335189 and 2002-335228.

SUMMARY OF THE INVENTION

In the communication system using impulse train having extremely narrow pulse width, information is transmitted through intermittent transmission and reception of energy signal, unlike the signal transmission using the ordinary continuous wave.

Since the pulses forming pulse train have extremely narrow pulse width as explained above, the signal spectrum thereof is expanded in the frequency band in comparison with the communication using the ordinary continuous wave and thereby signal energy is spread. As a result, signal energy per unit frequency band becomes very small. Therefore, communication can be realized without occurrence of interference on the other communication systems and the frequency band can be used in common.

As the wireless system for short-range radio communication in low power consumption, the Bluetooth and Zigbee using the continuous wave of 2.4 GHz band are known, but the UWB-IR communication system can be expected in more effective signal transmission because of simple structure of apparatus in comparison with the Bluetooth. Moreover, the Zigbee is also useful in application to the sensor network from the viewpoint of transmission in low power consumption. However, the UWB-IR communication system has the merits that a high precision positioning function may be added which has been impossible in the Zigbee and rapid transfer rate can be realized in accordance with application while the low power consumption is maintained. As explained above, the UWB-IR communication system can be said as the radio communication technology which is expected to provide new communication services not attained from the existing wireless systems, from the view of low cost, low power consumption, common use of frequency band, and high precision positioning function.

In an ordinary radio transmission system, a receiver is requested to realize initial acquisition of synchronization in order to reproduce the reception timing. In the communication system using direct sequence spread spectrum, the initial acquisition of synchronization is conducted in the receiving mode in order to detect an input pulse train signal before demodulation thereof and reproduce the reception timing of the input pulses and correlation timing with the spread code.

However, since the UWB-IR communication system intermittently transmits the pulse train having extremely narrow pulse width, it is required to assure very higher accuracy. Therefore, it is a problem of this communication system to realize rapid initial acquisition of synchronization, while the hardware is kept within a small scale and the power consumption is controlled to a lower value.

FIG. 24 and FIG. 25 show examples of a structure of transmitting apparatus in the direct sequence spread spectrum type UWB-IR communication system and FIG. 26 shows examples of signal waveforms in the UWB-IR communication system.

In FIG. 24, the transmitting apparatus includes an information source 150, a multiplier 151, a spread code generator 152, a pulse generator 153, a power amplifier (PA) 155 and an antenna 000. The information source 150 outputs a transmitting data to be transmitted. The spread code generator 152 outputs spread code sequence such as PN (Pseudo-random Noise) sequence. In this case, the spread code sequence is generated in the rate higher than that of the transmitting data by the information source 150. The transmitting data outputted from the information source 150 is multiplied in the multiplier 151 with the spread code sequence generated by the spread code generator 152. Accordingly, the transmitting data is spread directly and the spread data train can be generated.

The pulse generator 153 generates a transmitting pulse train in accordance with the spread data train as the output from the multiplier 151. In this case, polarity of pulse forming the output pulse train is inverted in accordance with a value of the spread data train. The pulse train generated by the pulse generator 153 is amplified in the PA 154 and is then transmitted from the antenna 000.

FIG. 26A is an example of the UWB signal waveform obtained by modulating the pulse train with the transmitting apparatus shown in FIG. 24, namely with the BPSK (Binary Phase Shift Keying) modulating method. In this waveform, polarity of pulse train is inverted in accordance with the value of transmitting data, "1" or "0".

In FIG. 25, the transmitting apparatus includes an information source 150, a multiplier 151, a spread code generator 152; 153, a pulse generator 153, a mixer 160, an oscillator 161, a power amplifier (PA) 154 and an antenna 000. The information source 150, multiplier 151, spread code generator 152, pulse generator 153, PA 154, and antenna 000 respectively have the functions similar to that of the information source 150, multiplier 151, spread code generator 152, pulse generator 153, PA 154, and antenna 000 in FIG. 24. The pulse train outputted from the pulse generator 153 is multiplied in the mixer 160 with a radio frequency signal outputted from the oscillator 161 and is then inputted to the PA 154.

FIG. 26B is an example of UWB signal waveform attained by modulating the pulse train with the transmitting apparatus of FIG. 25, namely by modulating the pulse train with the carrier in the BPSK modulation method.

The UWB-IR signal outputted from the transmitting apparatus shown in FIG. 24 or FIG. 25 is characterized in that the pulse width Tw is very narrow (up to 2 ns) and meanwhile a pulse interval is comparatively wide (from 10 ns) as shown in FIGS. 26A and 26B. Here, the pulse width Tw is defined as the length from the amplitude 0 to amplitude 0. Initial acquisition of signal synchronization for accurately matching the pulse phase to the signal having such a low duty ratio is considered as one of very large problems.

Use of a matched filter is one of the methods to realize such initial acquisition of signal synchronization. This method enables rapid acquisition of signal synchronization but requires, on the other hand, a large-scale hardware. Particularly, when it is attempted to realize a matched filter using digital circuits in the UWB-IR communication system, analog to digital conversion and signal processes of several Gsps are required, resulting in increase of power consumption.

Accordingly, a method is considered as the method to realize demodulation in low power consumption. In this method, the input pulse is synchronized in the timing with that of the analog to digital conversion by initial acquisition of signal synchronization, the analog to digital conversion is performed in every repetition frequency of the pulse, and demodulation is conducted after the despreading. "Rapid Signal Acquisition for Low-rate Carrier-based Ultra-wideband Impulse Radio" by Ryosuke Fujiwara; ISCAS205 Proc.; pages 4497 to 4500 (May 2005) describes in detail the method explained above.

FIG. 27 shows an example of a structure of the receiver having introduced the method explained above. In FIG. 27, the receiver includes an antenna 000, a band-pass filter (BPF) 180, a low noise amplifier (LNA) 181, an analog-to-digital converter (ADC) 182, a timing signal generator 183, a matched filter (MF) 184, a signal acquiring unit 185, a timing controller 186 and a demodulator 187.

The pulse train signal outputted from the transmitting apparatus as shown in FIG. 24 is inputted to the BPF 180 via the antenna 000 and only the signal of the desired frequency band having passed the BPF 180 is amplified in the LNA 181. The amplified receiving pulse train signal is subjected to analog-to-digital conversion in the ADC 182 through quantization in the period identical to the nominal pulse period of the pulse train. Conversion timing is supplied from the timing signal generator 183 with the clock signal having the nominal pulse period. The signal having completed digital conversion is despread with the same spread signal that conducted by the MF 184 in the transmitting side. The original information is demodulated from the despread signal by the demodulator 185.

For realization of the demodulation explained above, initial acquisition of signal synchronization is necessary to synchronize the analog-to-digital conversion by the ADC 182 to the timing of the input pulse strain. Namely, this acquisition of synchronization can be realized with the signal acquiring unit 185 and the timing controller 186.

During the operation for acquiring synchronization explained above, the timing signal generator 183 generates, as the first step, the clock for supplying adequate conversion timing to the ADC 182. In this timing, if the pulse strain signal S180 is not matched in the timing with the clock S181, an output of the ADC 182 is formed of only noise element not including the signal element and an output S182 of the MF 184 does not include the signal element also. In this case, the signal acquiring unit 185 judges that the signal does not exist and the timing controller 186 having received the result thereof shifts the phase of output clock of the timing signal generator 183 only in the amount Δt. With repetition of this operation, when the pulse train signal S180 is just matched with the clock S181 in the timing, an output of the ADC 182 includes the signal element and a large amplitude signal S182 is outputted therefrom because an despread signal is outputted as an output of the MF 184. In this timing, the signal acquiring unit 185 judges that the signal exists and completes acquisition of synchronization.

In the ordinary sequential search system explained above, the relation between search phase and pulse phase is expressed as illustrated in FIG. 28. That is, search is started from the adequate pulse phase and is continued sequentially until an output value exceeds the predetermined threshold value.

However, a pulse waveform may become distorted and ringing may occur due to multi-path in the actual radio environment or band-pass characteristic in the receiver. In such a case, the sequential search system explained above has a problem that acquisition of synchronization is completed at the peak position of pulse which is different from the primary peak position and thereby communication quality may be deteriorated.

Meanwhile, when a receiving signal level is considerably different depending on the distance between the transmitting point and the receiving point, and such receiving signal level is judged with reference to the predetermined threshold value, here arises a problem that acquisition of synchronization is completed at the area far from the center of the pulse in the larger receiving signal and thereby communication quality is deteriorated.

Moreover, if a frequency deviation exists within the lo oscillators between the transmitter and the receiver, it becomes further difficult to search accurate pulse reception timing.

An object of the present invention lies in providing a low cost UWB-IR receiving apparatus which assuring low power consumption and higher communication performance.

Another object of the present invention lies in providing the UWB-IR receiving apparatus for realizing rapid and highly accurate initial acquisition of synchronization of the ultra-wide band signal without increase in complicatedness of hardware and in power consumption.

According to one aspect of the present invention, a receiving apparatus for sampling and receiving the transmitting signals transmitted on the basis of the communication system to exchange pieces of information with the intermittent pulse train signal with the nominal pulse repetition frequency or with the frequency of integer times thereof is characterized in comprising an initial synchronization acquiring device for synchronizing the sampling timing of the receiving signal with the pulse position or pulse phase before the demodulation of the receiving signal, wherein the initial synchronization acquiring device is provided with: a peak search function for holding the largest output value as the peak value by searching all phases of the transmitting signals corresponding to the frequency in the first search resolution and also estimating, as a new peak phase estimated region, the phase region including the phase of the peak value and being more restricted than all the phases when the receiving signal exists by judging from existence of the receiving signal from such peak value; and a detailed synchronization acquiring function for searching the peak phase estimated region estimated by the peak search function with a second search resolution.

The present invention can provide, within the UWB-IR receiver, a synchronization acquisitioning function for rapidly and accurately searching the timing of the input pulse, thereby making it possible to provide a communication apparatus which assures low cost and low power consumption by controlling the frequency in the analog-to-digital conversion to a lower. frequency.

BRIEF DESCRIPTION OF THE DRAWINGS

These and other objects and advantages and further description of the invention will be more apparent to those skilled in the art, by reference to the description taken in connection with the accompanying drawings, in which;

FIG. 1 is a structural diagram for explaining a first embodiment of a receiving apparatus in the present invention, FIG. 2A is a schematic diagram for explaining the concept of a synchronization acquisition method in the present invention, FIG. 2B is a schematic diagram for explaining the concept of the synchronization acquisition method in the present invention.

DETAILED DESCRIPTION OF THE PREFERRED EMBODIMENTS

Figure 3:
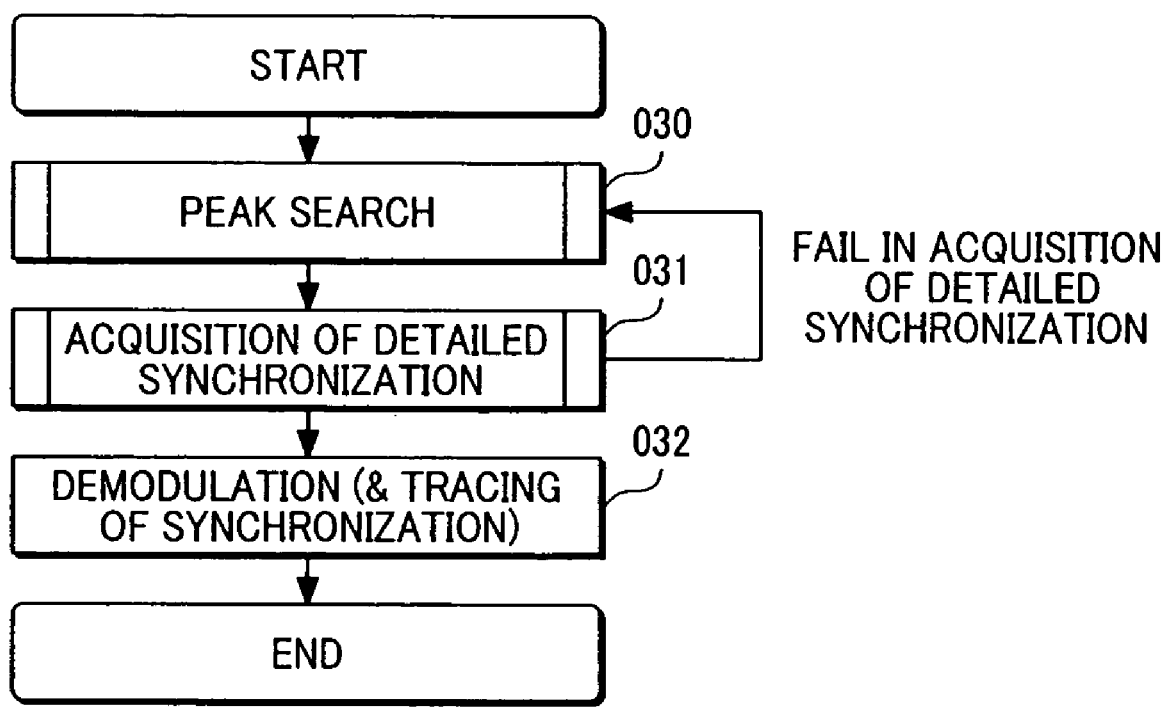
FIG. 3 is a flowchart for explaining an example of the receiving operation in the first embodiment.

The preferred embodiments of the present invention will be explained in detail with reference to the accompanying drawings.

First Embodiment

The first embodiment of the receiving apparatus in the present invention will be explained with reference to FIG. 1 to FIG. 12.

First, FIG. 1 is a schematic block diagram of the receiving apparatus in the first embodiment of the present invention. In FIG. 1, the receiving apparatus includes an antenna 000, a band-pass filter (BPF) 010, a low-noise amplifier (LNA) 011, a variable gain amplifier (VGA) 011, an analog-to-digital converter (ADC) 013, a matched filter (MF) 014, absolute value unit 015, a peak searcher 016, a detailed synchronization acquiring unit 017, a selector 018, a timing controller 019, a mode controller 020, a timing signal generator 021, a VGA controller 022, a demodulator 023, and a synchronization tracking unit 024.

Figure 24:
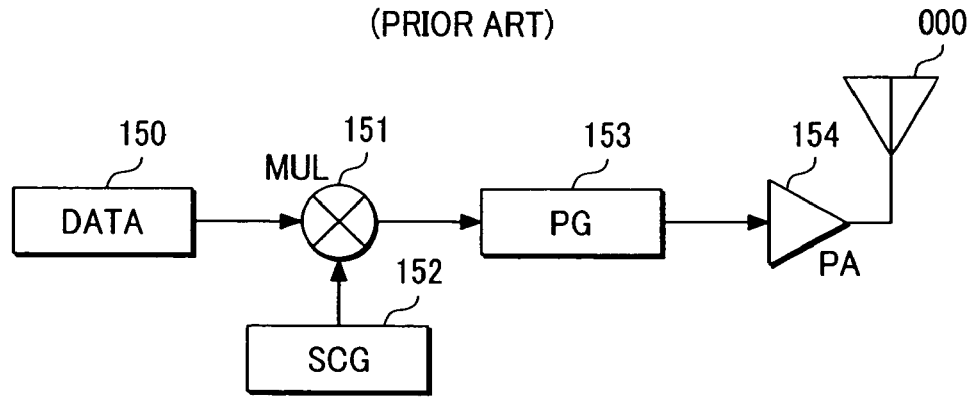
FIG. 24 is a structural diagram for explaining an example of the direct sequence spread spectrum type UWB-IR transmitting apparatus.
Figure 26A:
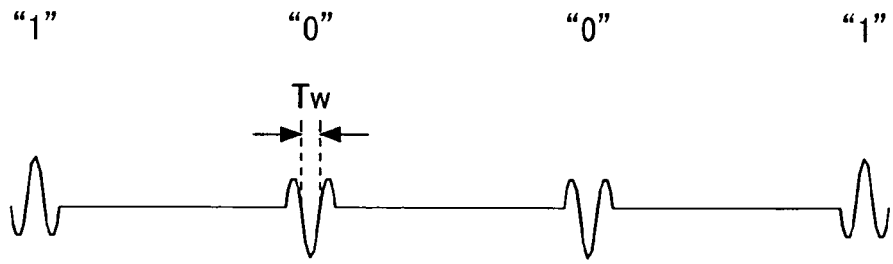
FIGS. 26A and 26B are diagrams for explaining waveforms of signals in the UWB-IR communication.

The signal received by the receiving apparatus in the present invention through the antenna 000 is, for example, a BPSK-modulated and directly spread pulse (impulse) train signal as shown in FIG. 26A transmitted by the transmitting apparatus of FIG. 24.

When the BPSK-modulated and directly spread pulse train transmitted from the transmitting apparatus of FIG. 24 is received by the antenna 000, the BPF 010 in FIG. 1 allows the signal of the predetermined frequency band to pass. This signal is then amplified with the LNA 011 and the VGA 012 and is inputted to the ADC 013.

The ADC 013 executes the analog-to-digital conversion of the pulse train transmitted by the transmitting apparatus in the nominal pulse period or in the integer times thereof. This conversion timing is supplied with the clock of the pulse period or the integer times thereof outputted from the timing signal generator 021. Moreover, the timing signal generator 021 shifts the output timing with the signal of the timing controller 019.

The digital signal converted in the ADC 013 is then despread in the matched filter MF 014 having the same spread code sequence with the transmitting signal. The absolute value unit 015 outputs the absolute value of the despread signal. The peak searcher 016 searches a peak value of the output from the MF 104 in a plurality of conversion timing phases in the ADC 013 and also searches the conversion timing phase of such peak value. Moreover, the peak searcher 016 judges whether the receiving signal exists from such peak value.

A plurality of conversion timing phases are realized when the timing controller 019 shifts the output timing of the output clock of the timing signal generator 021 as much as the predetermined search resolution on the basis of an instruction to the timing controller 019 issued from the peak searcher 016.

The detailed synchronization acquiring unit 017 detects the phase of the despreading timing of the MF 014 and shifts the output timing of the output clock of the timing signal generator 021 as much as the predetermined search resolution via the timing controller 019 until the despread output signal becomes equal to or exceeds a certain threshold value. Acquisition of synchronization in detail timings can be realized by making the shift width explained above smaller than that required when the peak value is searched. Moreover, the threshold value explained above can be controlled with the peak value in the peak searcher 016.

The VGA controller 022 sets an amplification factor of the VGA 012 in accordance with the peak value in the peak searcher 016.

The demodulator 023 receives, after completion of acquisition of synchronization, an output of the MF 014 and the timing for despreading from the detailed synchronization acquiring unit 017, followed by demodulation.

The synchronization tracking unit 024 monitors the signals to maintain timings thereof in order to control the output timing of the timing signal generator 021 after the input pulse train is synchronized with the conversion timing in the ADCO 13 based on acquisition of synchronization. In regard to the synchronization tracking system, such a method is never restricted. A concrete example of the synchronization tracking system will be explained later in detail.

The mode controller 020 controls operations in each block of the peak searcher 016, detailed synchronization acquiring unit 017 and synchronization tracking unit 024. Moreover, a shift instruction issued to the timing controller 019 from each block is selected by the selector 018.

Concept of the synchronization acquisition method which may be realized with employment of the structure of FIG. 1 will be explained with reference to FIG. 2A and FIG. 2B.

FIG. 2A and FIG. 2B respectively show the waveform of pulse inputted to the ADC 013 and phase relationship of conversion timing in the ADC 013. FIG. 2A shows control of amplification factor of the VGA 012, while FIG. 2B shows control of the threshold value.

In FIG. 2A, the largest output value (peak value) and the conversion timing phase thereof (peak phase) are searched in all phases in the search resolution within the input pulse phase. (Peak search STEP 1)

However, the pulse period of the input pulse train is usually not matched perfectly with the period of clock in the timing signal generator 021 due to the performance of oscillators used in the transmitter and receiver. Because of this influence, it is assumed that considerable time error exists after measurement of all phases in the search resolution. Therefore, the peak phase explained above is searched as an estimated region having a certain range, for example, a range corresponding to time error estimated from frequency deviation.

Accordingly, it is necessary to estimate again the peak phase in all phases in the search resolution in the estimated phase region.

Moreover, before the peak phase is searched again in the estimated region, the amplification factor of the VGA 012 is set again while the threshold value is maintained to a constant value in accordance with the peak value monitored previously. (Peak search STEP 2) For example, the amplification factor of the VGA 012 is set again to a smaller value in accordance with the preceding peak value.

When the phase estimated region becomes narrower than the predetermined range, more preferably, the pulse width of the input pulse after repetition of such operations, acquisition of detailed synchronization is conducted.

In this acquisition of detailed synchronization, search resolution is set higher than that used for the peak phase search explained above in view of searching the conversion timing phase where an output becomes larger than the threshold value. In this case, the amplification factor of the VGA 012 is set again as required with the method similar to the peak search (acquisition of detailed synchronization).

It is also possible to control the threshold value as shown in FIG. 2B in place of changing the amplification factor of the VGA. Namely, in the peak search STEP 2, the threshold value is altered to a larger value in accordance with the preceding peak value, while the amplification factor of the VGA 012 is maintained. When the phase estimated region becomes narrower than the predetermined range, more preferably, the pulse width of the input pulse after repetition of such operations, acquisition of detailed synchronization is executed. In the acquisition of detailed synchronization, the search resolution is set higher than that used for the peak phase search and the conversion timing phase where an output becomes equal to or larger than the threshold value is searched. The threshold value for judging existence of signal in the detailed synchronization acquiring unit 017 is set again as required (acquisition of detailed synchronization).

Moreover, both amplification factor of VGA and threshold value may be controlled simultaneously, but explanation of such control is eliminated here.

FIG. 3 shows the operations explained above in the form of a flowchart. In the peak search process 030, a peak phase region is estimated and in the detailed synchronization acquisition process 031, accurate pulse phase is searched in the estimated region. When the accurate pulse phase is searched in the detailed synchronization acquisition process 031, the demodulation process 032 in the pulse phase explained above is started. Tracking of synchronization is also conducted simultaneously as required to maintain the pulse phase.

Figure 4:
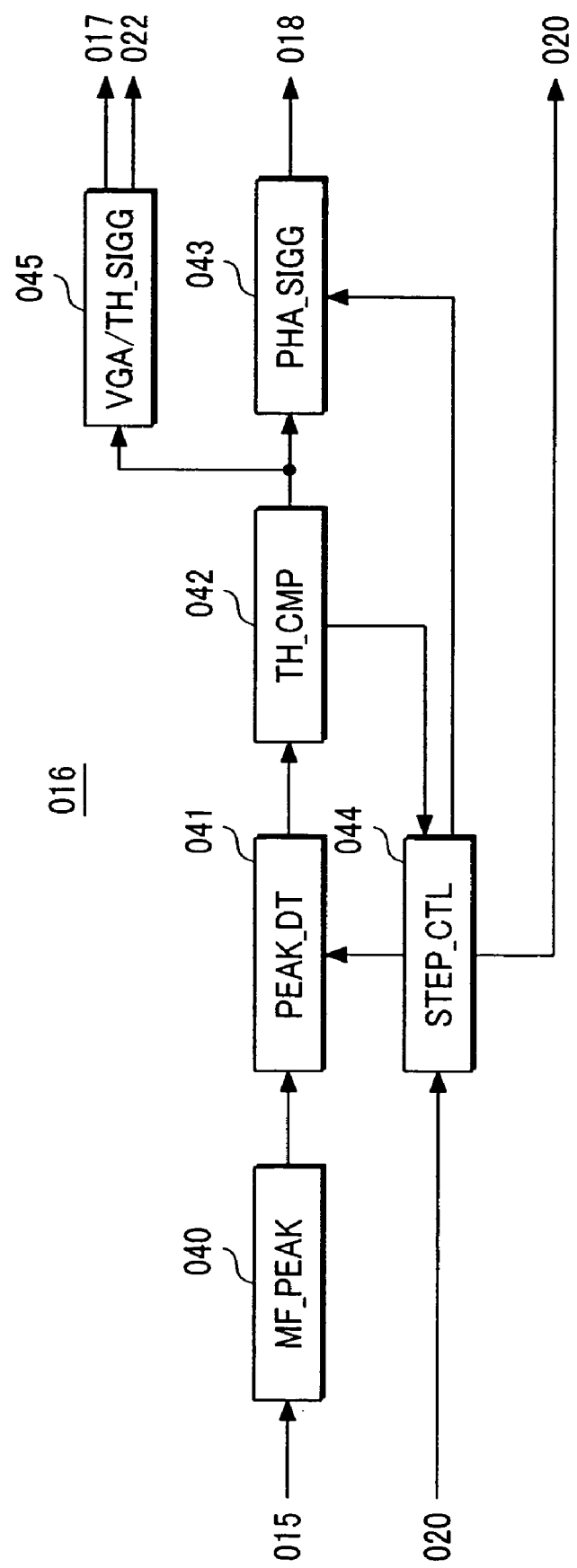
FIG. 4 is a schematic diagram for explaining an example of a structure of a peak searcher in the first embodiment.

FIG. 4 is a schematic diagram for explaining an example of a structure of the peak searcher 016 in the first embodiment. In FIG. 4, the peak searcher 016 includes a MF peak detector 040, a peak detector 041, a threshold value determining unit 042, a phase control signal generator 043, a step number controller 044 and a VGA/threshold value control signal generator 045.

Figure 5:
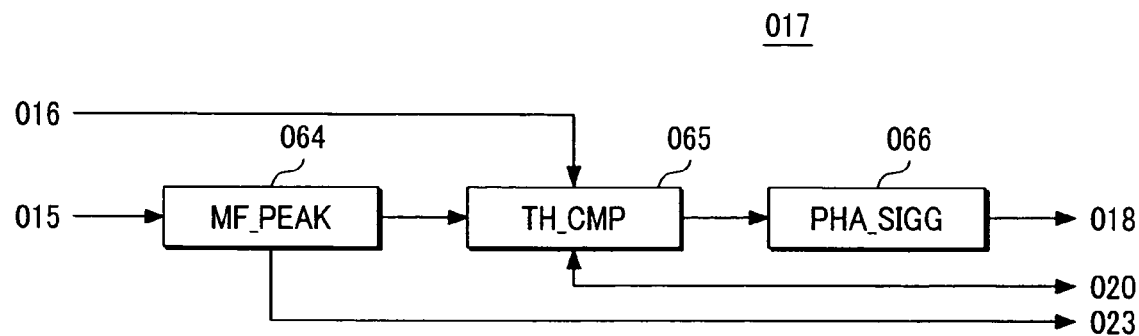
FIG. 5 is a schematic diagram for explaining an example of a structure of a detailed synchronization acquiring unit in the first embodiment.

Next, FIG. 5 is a schematic diagram for explaining an example of a structure of the detailed synchronization acquiring unit 107 in the first embodiment. In FIG. 5, the synchronization acquiring unit 107 includes a MF peak detector 064, a threshold value determining unit 065 and a phase control signal generator 066.

Figure 6:
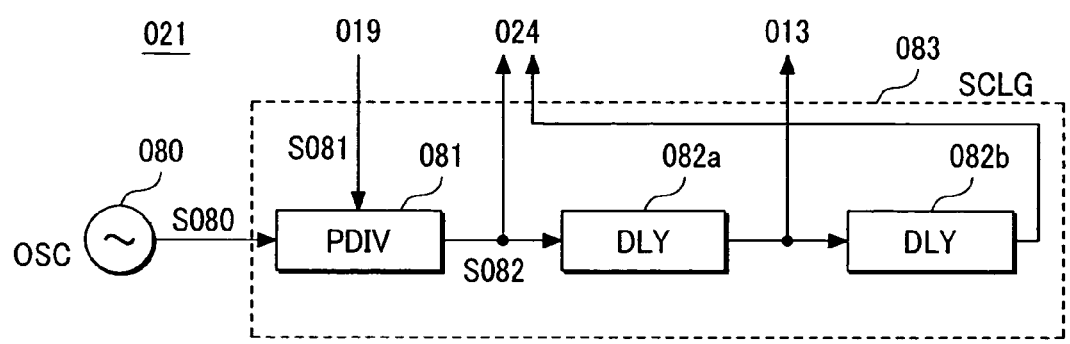
FIG. 6 is a schematic diagram for explaining an example of a structure of a timing signal generator in the first embodiment.

Next, FIG. 6 is a schematic diagram for explaining an example of a structure of the timing signal generator 021 of the receiving apparatus in the first embodiment. In FIG. 6, the timing signal generator 021 includes an oscillator 080, a programmable frequency divider 081 and relay elements 082a, 082b. A synchronization clock generator is formed by the programmable frequency divider 081 and relay elements 082a, 082b. The delay elements 082a, 082b are provided to enable the DLL (Delay Lock Loop) type synchronization tracking function and these elements are not always required for embodying the present invention.

Figure 7:
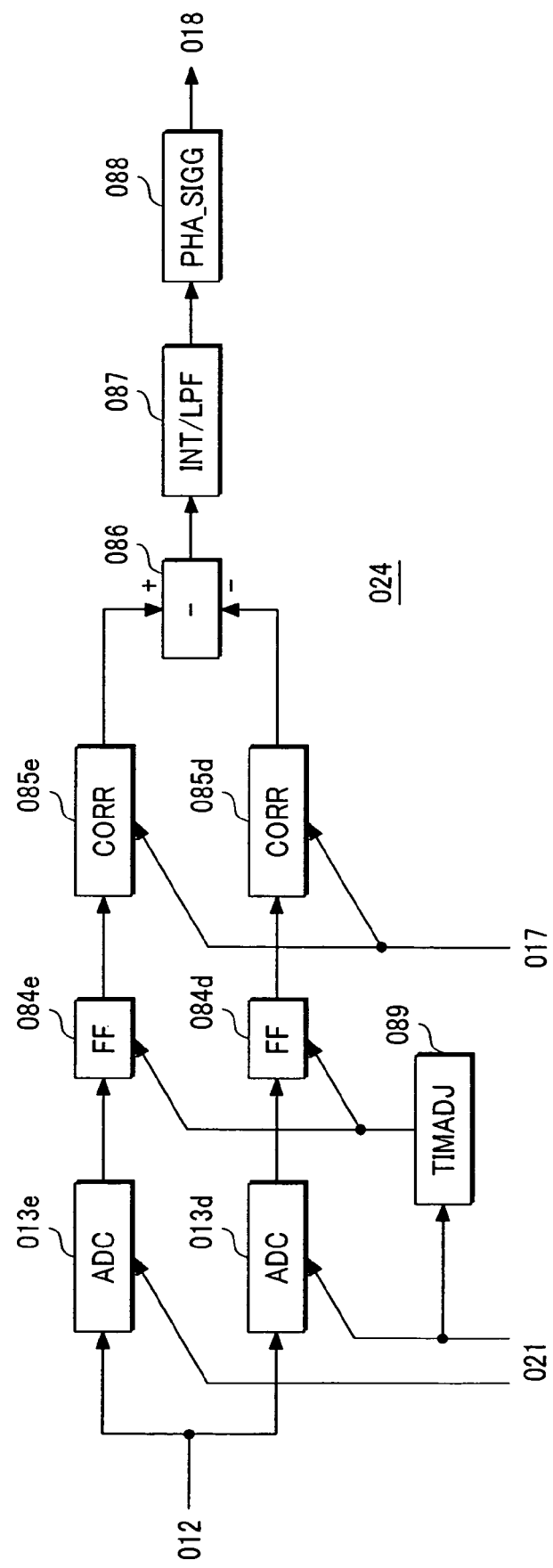
FIG. 7 is a schematic diagram for explaining an example of a structure of a synchronization tracking unit in the first embodiment.

As an example to realize the synchronization tracking function, the DLL type synchronization tracking function is constituted with the timing signal generator 021 and the timing controller 019 shown in FIG. 6 and a synchronization tracking unit 024 shown in FIG. 7. FIG. 7. shows the synchronization tracking unit 024. In FIG. 7, the synchronization tracking unit 024 includes analog-to-digital converters (ADCs) 013e and 013d, flip-flops 084e, 084d, code correlators 085e, 085d, a subtractor 086, an integrator/low-pass filter 087, a phase control signal generator 088 and a timing adjusting unit 089.

The ADCs 013e, 013d in FIG. 7 have the function identical to that of the ADC 013 in FIG. 1.

The ADC 013e, ADC 013d conduct analog-to-digital conversion in the timing of the clock generated with the timing signal generator in FIG. 6. In the clock, the clock supplied to the ADC 013e in FIG. 1 has the phase leading the clock supplied to the ADC 013 in FIG. 1, while the ADC 013d has a delayed phase. A phase difference between these clocks is preferably equal to or smaller than the time width Tw of the receiving pulse.

In the flip-flops 084e, 084d, outputs of the ADC 013e and ADC 013d are provided as the signals of the same timing. In this case, the clocks supplied to the flip-flops 084e, 084d are adjusted in delay as required in the timing adjusting unit 089.

Outputs of the flip-flops 084e, 084d are inversely correlated with the code used for correlation of the transmitting signal in the code correlators 085e, 085d and a difference between both outputs is obtained with the subtractor 086. The timing for despreading is supplied from the detailed synchronization acquiring unit 017. The integrator/LPF 087 eliminates a noise element. The phase control signal generator 088 outputs the conversion timing control signal in the ADC 013 to the timing signal controller 018 in accordance with an output of the integrator/LPF 087 in order to correct the timing.

Figure 8:
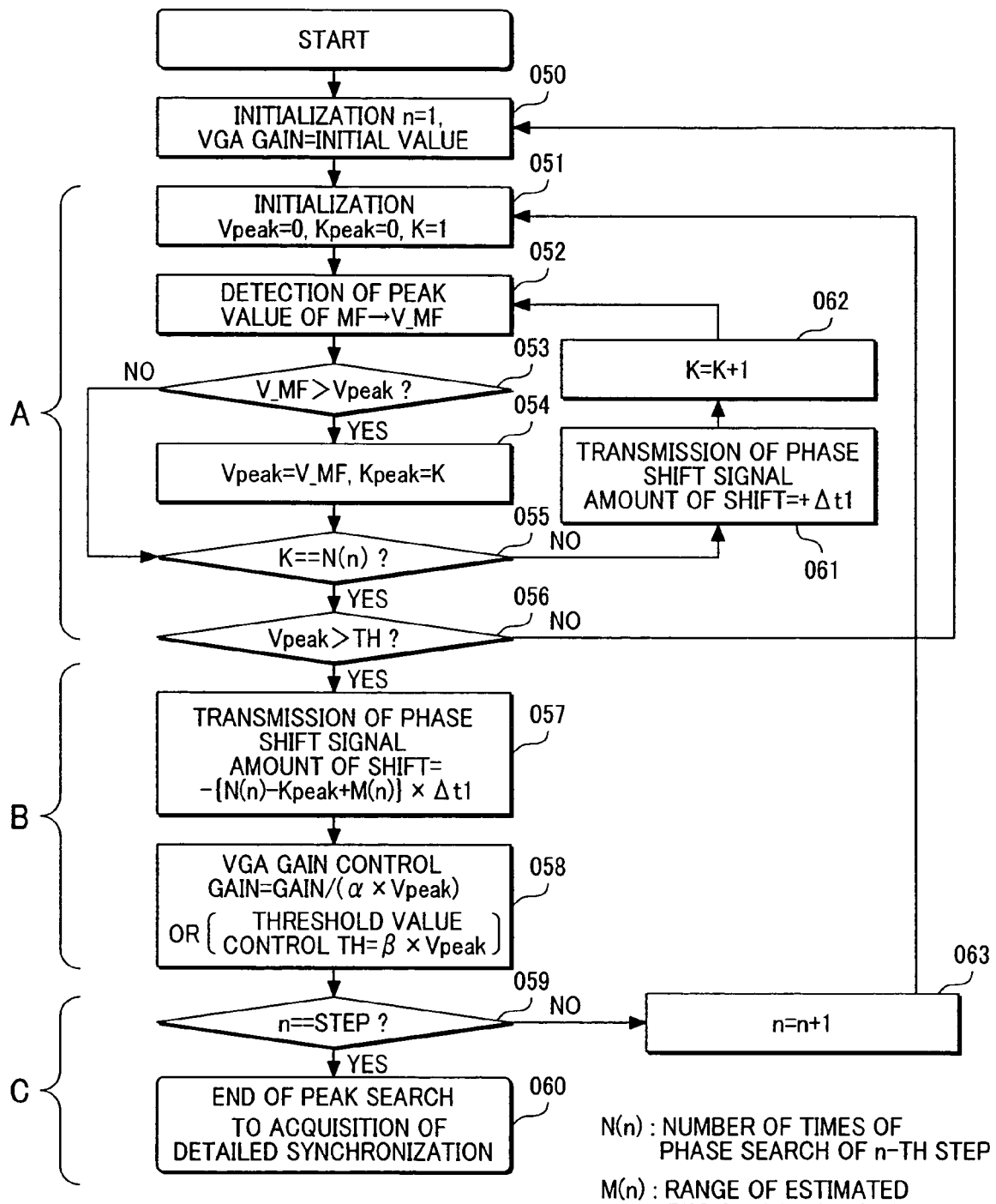
FIG. 8 is a flowchart for explaining an example of a peak search process in the first embodiment.

Next, operations of the peak searcher 016 will be explained in detail with reference to FIG. 8. FIG. 8 is a flowchart of the peak search process 030 in the first embodiment. Operations will be explained using reference numerals in the block diagram of FIG. 4 and FIG. 8.

In FIG. 8, the receiving signal at each phase, the maximum value of correlation value of code, and the phase thereof are obtained in the region A and the maximum value is compared with the threshold value. Moreover, (1) shift of phase to the estimated region of peak phase (width of the estimated region: M(n)) and (2) gain control are conducted in the region B. Moreover, after the estimated region of the peak phase is further narrowed for the predetermined number of times in the region C, the process is shifted to the detailed synchronization acquiring unit.

In more detail, after reception of signal, the peak search process 030 is started first and the amplification factor of the VGA 012 is set to the initial setting value (050). The letter K in the flowchart indicates the present number of times of phase search in the present step and initialization is conducted simultaneously (051). The MF peak detector 040 calculates the peak value (V_MF) of the output of the MF 014 at the present conversion timing phase in the ADC 013 (052). Next, the output timing of the timing signal generator 021 is shifted only by the predetermined width ($\Delta t1$) to shift the conversion timing phase in the ADC 013 (061). The shift width ($\Delta t1$) explained above becomes the resolution of search. Simultaneously, the present number of times of phase search K is incremented (062). Thereafter, the output peak value (V_MF) of the MF 014 in this conversion timing phase is also calculated (052).

This calculation is repeated (055) for all phases (N(1) times) of the input pulse train and the peak detector 041 obtains the conversion timing phase (peak phase: Kpeak) when an output of the MF 014 becomes largest finally and the peak value (Vpeak) thereof (053, 054).

Next, the threshold value determining unit 042 compares the peak value (Vpeak) with the predetermined threshold value (TH) (056). When Vpeak is smaller than TH (Vpeak<TH), the state immediately after the start of reception appears again under the determination that the signal does not exist. When Vpeak is equal to or larger than TH (Vpeak≧TH), the phase control signal generator 043 changes the conversion timing in the ADC 013 to the detected peak phase under the judgment that the signal exists (057). In this case, since uncertainty exists in the region due to the influence of frequency deviation between the transmitter and receiver as explained above, the conversion timing phase is changed with inclusion of the estimated region range (M(1) times) thereof. In this timing, amount of phase shift in the n-th step is calculated ($-\{N(n)-Kpeak+M(n)\}\times\Delta t1$). Here, N(n) is the number of times of phase search of the n-th step. M(n) is the range of the phase estimating range of the n-th step which can be obtained by calculation from the previously estimated frequency deviation. Moreover, the peak phase is assumed to appear in the Kpeak times among the phase searches of the N(n) times.

The conversion timing phase changing process will be explained in detail with reference to FIG. 9.

Next, the VGA/threshold value controller 045 controls as required, in order to further narrower the phase estimated region, the amplification factor (Gain) of the VGA 012 or the threshold value TH in accordance with the peak value Vpeak (058).

As an example of control of the amplification factor of the VGA 012, there is provided a method for controlling the amplification factor through inverse proportion to the peak value Vpeak.

For example, such amplification factor (Gain) is defined as follows.

$$Gain=Gain/(\alpha \times Vpeak)$$

Moreover, in this case, the similar effect can also be achieved by controlling the threshold value TH without control of the amplification factor of the VGA 012. As an example of control, in this case, the next threshold value is determined in proportion to the peak value Vpeak.

For example, the new threshold value TH is calculated as follows.

$$TH = \beta \times V\text{peak}$$

It is also possible to simultaneously control the amplification factor (Gain) of the VGA 012 and the threshold value TH with the VGA/threshold value controller 045 in accordance with the peak value Vpeak.

Figure 10:
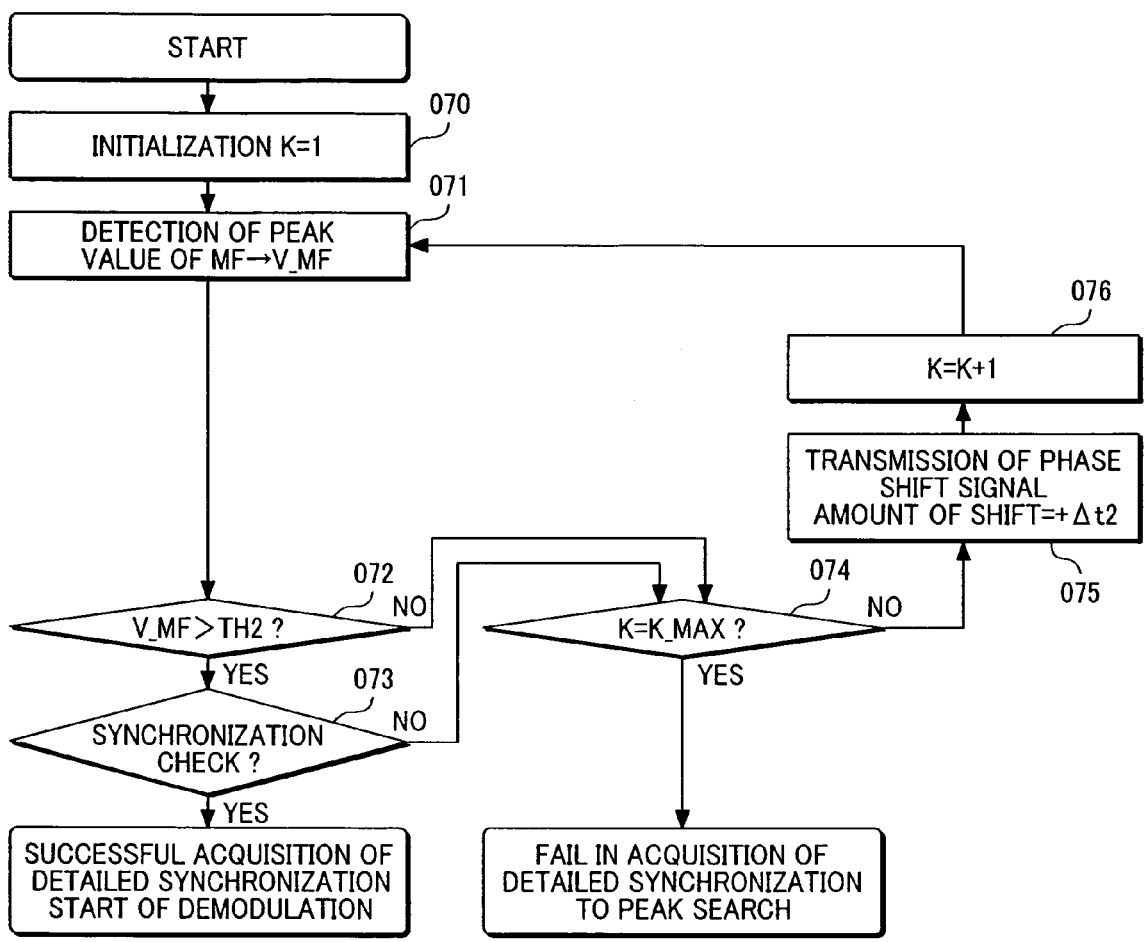
FIG. 10 is a flowchart for explaining an example of a process of the detailed synchronization acquiring unit in the first embodiment.

Control of amplification factor of the VGA 012 and control of the threshold value will be explained with reference to FIG. 10.

After repetition of the operations (051 to 058) for estimating the peak phase explained above in the predetermined number of steps (059), the peak search process 030 is completed and the process shifts to the detailed synchronization acquisition process 031 (060).

Here, the predetermined number of steps until the peak search process 030 is completed is set, for example, in the manner that the search is repeated until the new peak phase estimated region becomes equal to or narrower than the pulse width TW of the transmitting signal shown in FIG. 26.

The step number controller 044 of FIG. 4 administrates the present number of steps (n), range of phase search (N(n)) in the present step, and phase estimating margin (M(n)) to supply the process timing of the peak detector 041 and phase control signal generator 043. Moreover, the step number controller 044 notifies the end of peak search of the mode controller 020 and it is controlled, on the contrary, whether the peak searcher 016 should be operated in accordance with the mode information from the mode controller 020.

Next, the process (057) for changing the conversion timing phase in the ACD 013 in FIG. 8 to the peak phase, namely, the phase shift method will be explained in detail with reference to FIG. 9. FIG. 9 shows an example of the waveforms of output S080 of the oscillator 080, control signal S81 from the timing controller 019 and an output 082 of the programmable frequency divider 081, and an example of the phase shift control.

The clock supplied to the ADC 013 can be generated by dividing the frequency of an output signal S080 of the oscillator 080 having the period δ with the programmable frequency-divider 081. Here, the division number for obtaining the clock in the same period as the pulse train is defined as N for the explanation.

Figure 9:
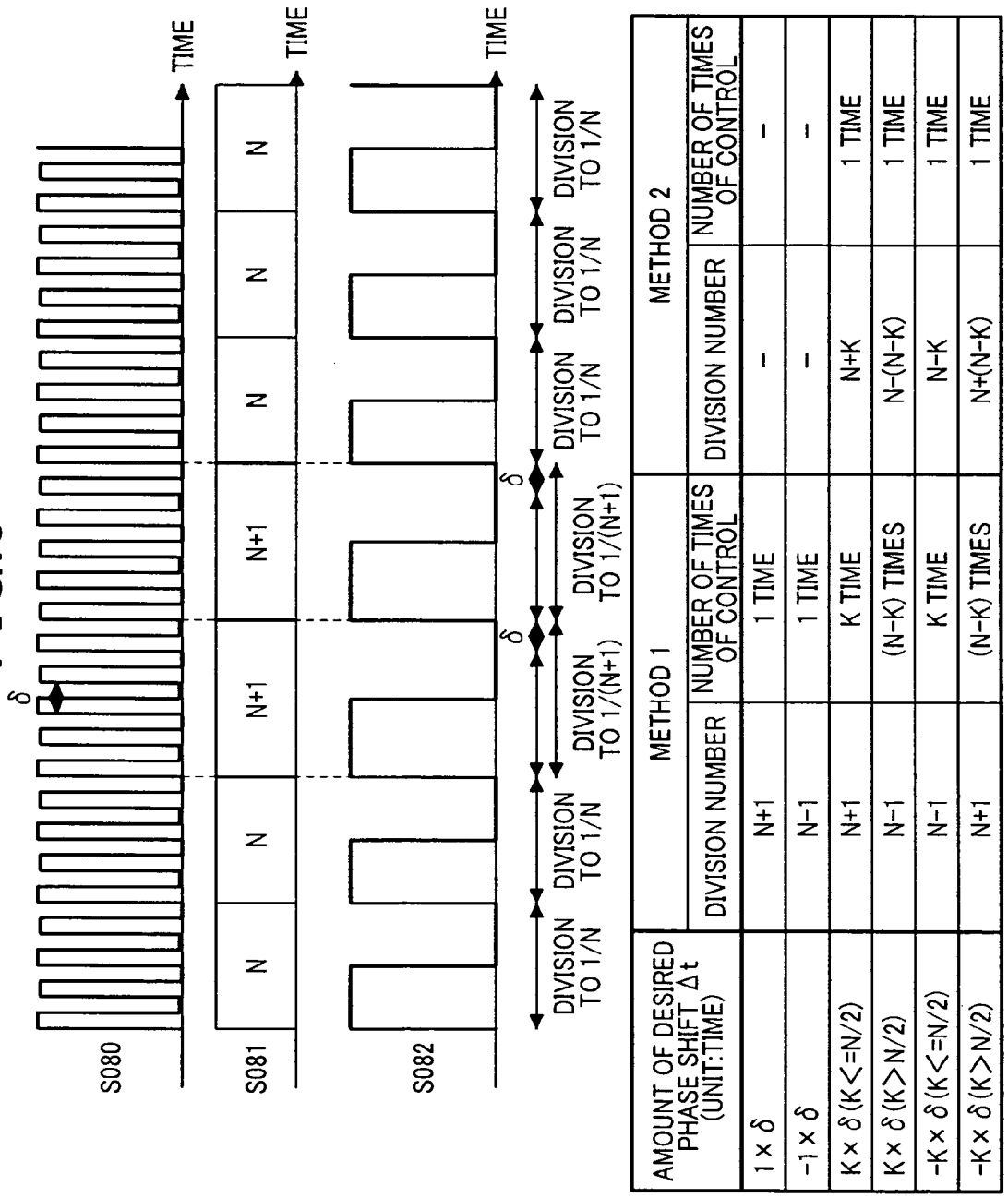
FIG. 9 is a diagram for explaining a phase shift method using a timing signal generator in the first embodiment.

As shown in FIG. 9, when the phase of clock S082 is shifted only by 2×δ, such phase shift can be realized by setting the division number to (N+1) only two times. Similarly, in the case where the phase of clock S082 is shifted only by −2×δ, such phase shift can be realized by setting the division number to (N−1) only two times.

As explained above, the desired phase shift in the minimum unit of δ can be realized by changing the division number. For example, when N=10, phase shift of only 3×δ can be realized by setting the division number to 11(=10+1) three times or to 13(=10+3) only a single time. Moreover, the phase shift of only 7×δ can be realized by setting the division number to 9(=10−1) three times or to 7(=10−3) only a single time, because it is equivalent to the shift of −3×δ.

Next, an example of detailed operations of the detailed synchronization acquisition process 031 in FIG. 3 will be explained with reference to FIG. 10. FIG. 10 is a flowchart of the detailed synchronization acquisition process 031 by the detailed synchronization acquiring unit 017. Operations will be explained using each block of the detailed synchronization acquiring unit 017 in FIG. 5 and each reference number in FIG. 10.

Upon completion of the peak search process 030, the detailed synchronization acquisition process 031 is started. The MF peak detector 064 calculates the peak value (V_MF) of the output of the MF 014 in the present conversion timing phase in the ADC 013 (071). This MF peak detector 064 may also be used in common with the peak detector 040 in FIG. 4.

The threshold value determining unit 065 compares the peak value (V_MF) with the threshold value (TH) (072). When V_MF<TH, the output timing of the timing signal generator 021 is shifted only by the predetermined width (Δt2) (075) via the phase control signal generator 066 in order to shift the conversion timing phase in the ADC 013. In this case, when Δt2≧Δt1, search resolution can be increased.

When V_MF≧TH, synchronization check (073) is conducted as required, the detailed synchronization acquisition process is completed, and the demodulation process is started. In this timing, end of the detailed synchronization acquisition is notified to the mode controller 020. Moreover, in this timing, the MF peak detector supplies the despread phase which is the phase of peak output of the MF 014 to the demodulator 023.

Moreover, when the state of V_MF<TH is continued for the predetermined number of times (K_MAX), the process returns to the peak search 030 under the determination that the acquisition of detailed synchronization has failed. In this timing, fail in acquisition of detailed synchronization is notified to the mode controller 020.

Figure 11A:
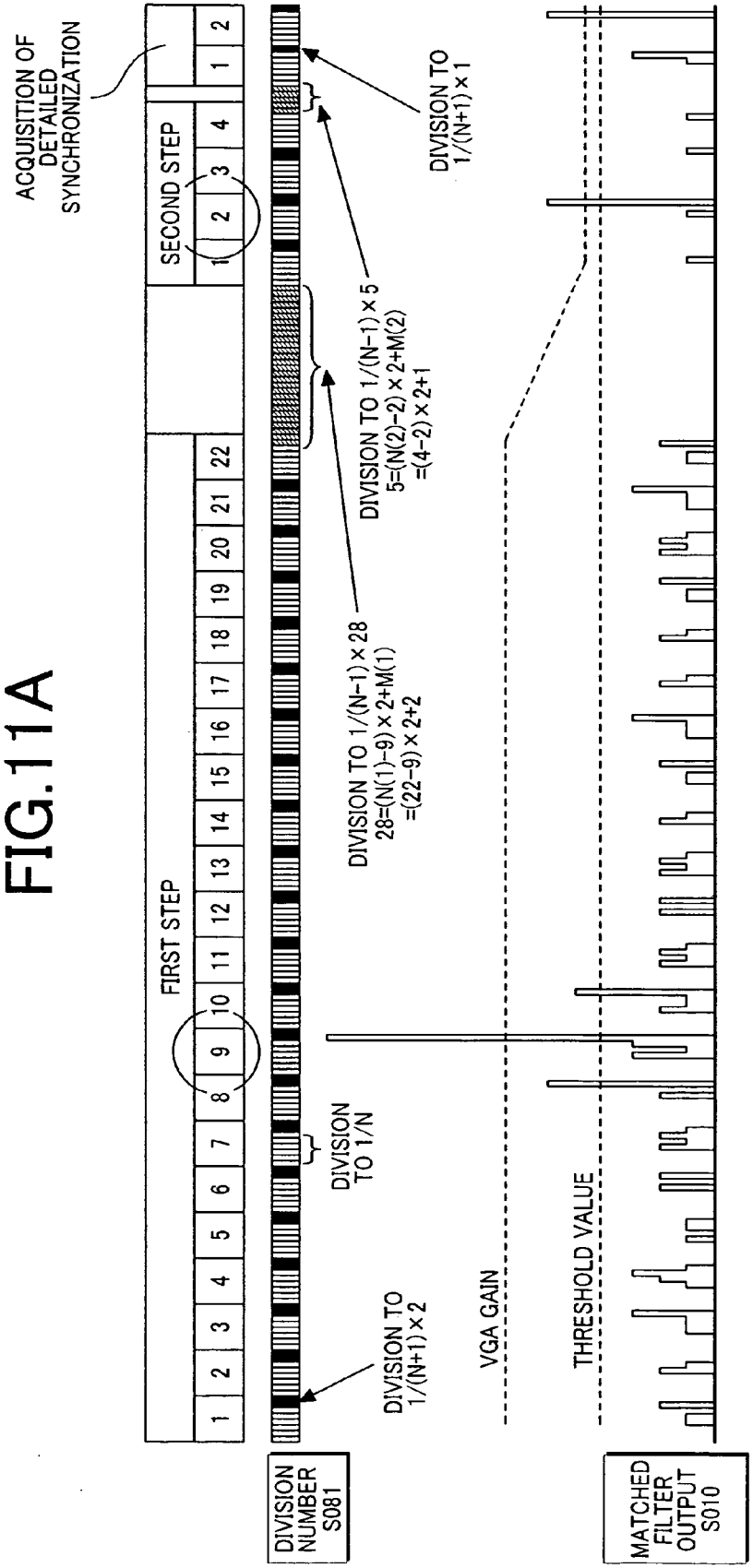
FIG. 11A is a diagram for explaining a timing signal control method in the first embodiment.

Next, an example of operation of the synchronization acquisition process when the timing signal generator 021 of FIG. 6 is used will be explained with reference to FIGS. 11A and 11B. First, an example of operation of the synchronization acquisition process executed by controlling the amplification factor (Gain) of the VGA will be explained with reference to FIG. 11A. FIG. 11A shows, from the top, the number of peak search steps, number of times of phase search, control signal S081 from the timing controller 019, namely frequency division number of the programmable frequency divider 081, and the absolute value of output of the MF 014. Moreover, amplification factor of the VGA and the threshold value level are also indicated.

For simplification of explanation, the number of steps (STEP) in the peak search 030 is 2, spread code length is 4, search resolution in peak search is 2×δ, search resolution in acquisition of detailed synchronization is 1×δ, ranges of phase search N(1), N(2) in each step are 22, and 2, and ranges of phase estimated region M(1), M(2) in each step are 2, and 1. Moreover, in FIG. 11A, only the amplification factor of the VGA is controlled and the threshold value level is maintained to the constant value.

During the peak search, the search resolution 2×δ can be realized by setting the division number of the programmable frequency divider 081 to (N+1) only two times in every search. In the first step, since the S010 is the highest output value in the ninth search in the first step, the phase shift to the second step from the first step becomes equal to −{(22−9)×2+2}×δ=−28×δ. Accordingly, the division number of the programmable frequency divider 081 is set to (N−1) only 28 times.

On the basis of the peak search result of the first step, the phase region including the largest output value (peak value) of the absolute value S010 of the output from the MF 014 and being narrowed than all phases is estimated as the new peak phase estimated region. In this new peak phase estimated region, a plurality of larger output values exceeding the threshold value are allocated not only for the largest output but also for the outputs near such largest output. These outputs include output values of ringing and noise.

In the next second step, the threshold value is maintained to the constant value and the amplification factor of the VGA is controlled in accordance with the peak value of the first step. In the case of this example, since the peak value is larger than the predetermined value TH, the amplification factor is reduced. As a result, since only the largest output value of the absolute value S010 exceeds the threshold value, the region equal to or smaller than the pulse width TW of the input pulse train including the largest output value is determined as the peak phase estimated region, in this case, as the final estimated region in the peak search.

When the peak value of the second step is larger than the predetermined value, the amplification factor of the VGA is further reduced.

Moreover, in the acquisition of detailed synchronization, the search resolution 1×δ is realized by setting the division number of the programmable frequency divider 081 to (N+1) in the single time for each search and the acquisition of detailed synchronization is completed with the second search having exceeded first the threshold value.

Figure 11B:
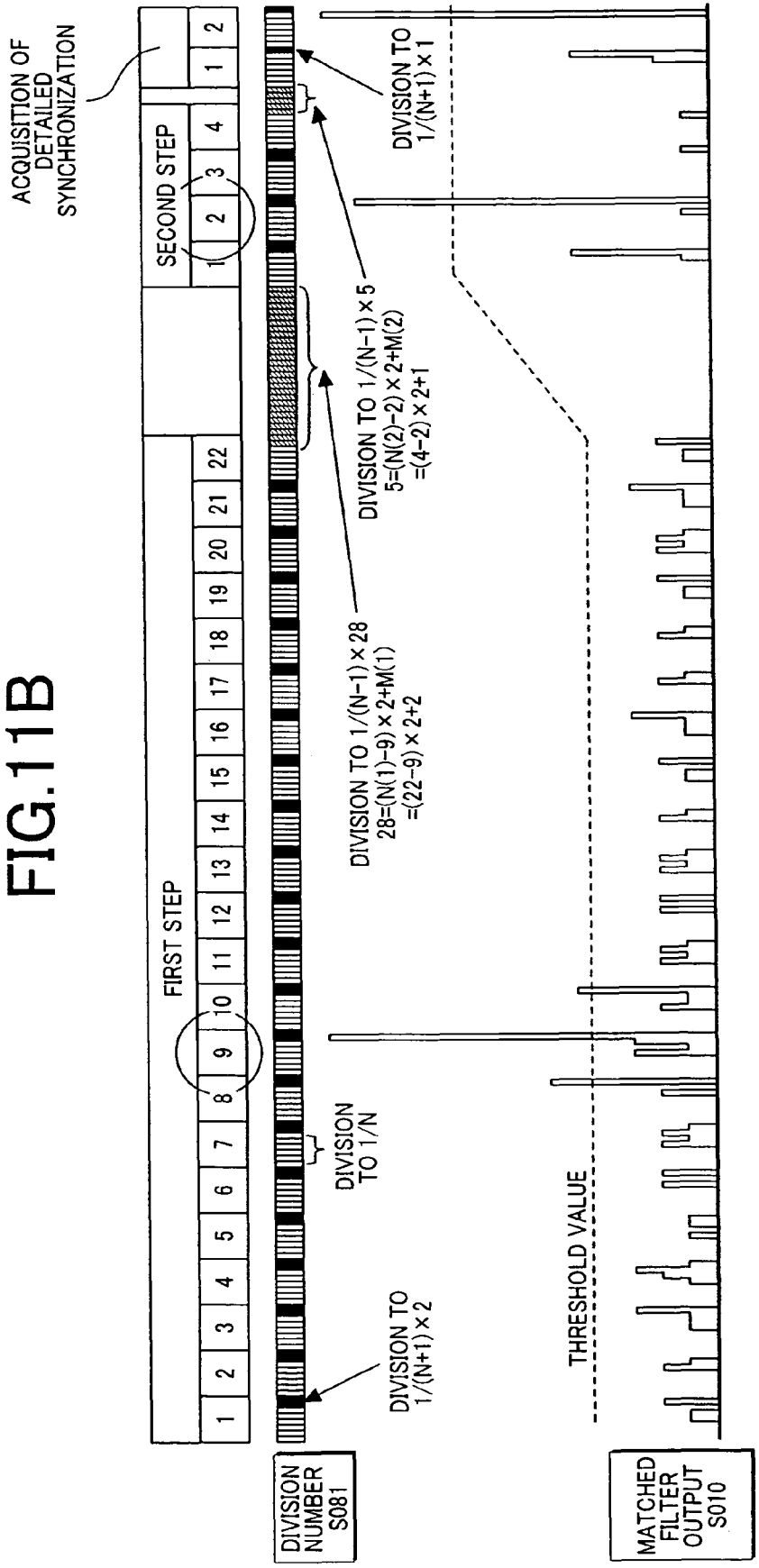
FIG. 11B is a diagram for explaining the timing signal control method in the first embodiment.

Moreover, FIG. 11B shows, like the FIG. 11A, an example of the control of threshold value without control of the amplification factor of the VGA.

Namely, the number of steps (STEP) in the peak search 030 is 2, the spread code length is 4, search resolution in the peak search is 2×δ, search resolution in the acquisition of detailed synchronization is 1×δ, ranges of phase search N(1) and N(2) in each step are 22, and 2, and the ranges of phase estimated region M(1), M(2) in each step are 2, and 1. Moreover, it is assumed that the amplification factor of the VGA is not controlled but the threshold level is altered.

In this case, since the peak value in the first step is larger than the predetermined value TH, the threshold value is increased while the amplification factor of the VGA is maintained to a constant value in the second step. As a result, since only the largest value of the absolute value S010 in the second step exceeds the threshold value, the region equal to or smaller than the pulse width TW of the input pulse train including the largest output value becomes the new peak phase estimated region, in this case, the final phase estimated region in the peak search.

Under the environment where a plurality of larger output values of the absolute value S010 exceeding the threshold value exist even in the second step, similar peak search is repeated.

In addition, in the acquisition of detailed synchronization, the search resolution 1×δ can be realized and the acquisition of detailed synchronization is completed in the second search where the output has exceeded first the threshold value.

Figure 12A:
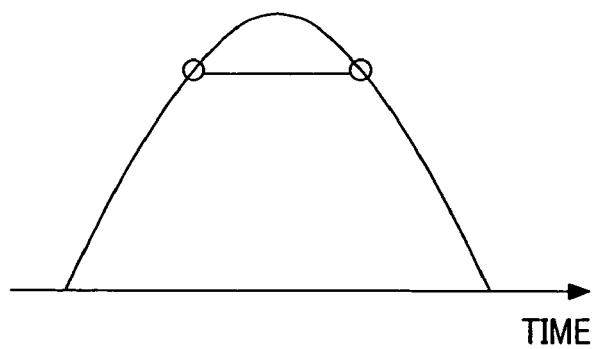
FIGS. 12A to 12C are waveforms for explaining the principle of the synchronization acquiring unit in the first embodiment.
Figure 12B:
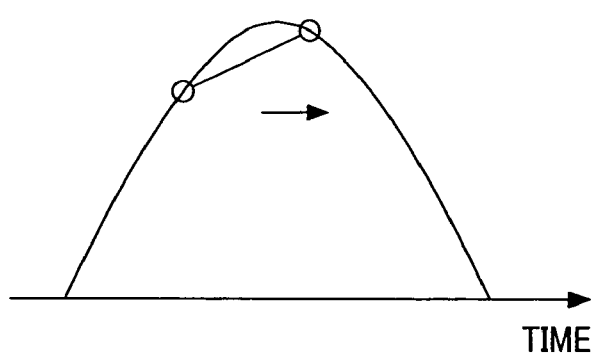
Figure 12C:
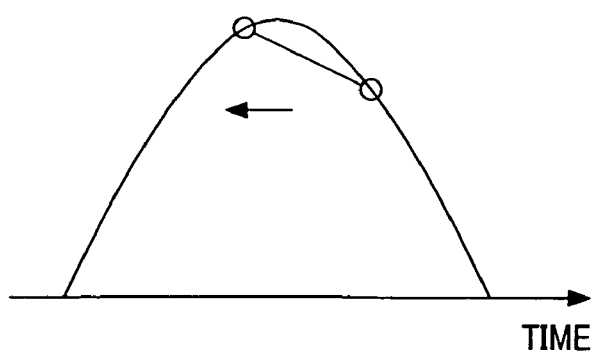

Next, the principle of tracking of synchronization which is possible in the structure of FIG. 7 will be explained with reference to FIGS. 12A to 12C. These figures respectively show the state where conversion timing in the ADC is matched for pulse waveform, the conversion timing is leading, and the conversion timing is being delayed. Circles in these figures indicate conversion by the ADC 013e, ADC 013d of the synchronization tracking unit 024. The leading state of conversion timing (B) and the delayed state of conversion timing (C) can be identified to correct the conversion timing by obtaining a difference after the despreading with the spreading code of the converted values in the ADC 013e and ADC 013d.

With the structure explained above, tracking can be realized only with a simplified structure in the case where the input pulse is deviated from the conversion timing in the ADC 013.

The basic structure and function of the receiving apparatus in the first embodiment of the present invention have been explained above. Owing to the structure and function explained above, a low cost and low power consumption UWB-IR receiver can be realized by realizing rapid and high performance acquisition of synchronization even in the case where if the oscillation frequency is deviated between the transmitter and receiver without any influence of multi-path environment and the frequency characteristics of the receiver, while the low speed analog-to-digital conversion is executed.

As explained above, this first embodiment can provide a low cost and low power consumption communication apparatus in the UWB-IR receiver of the simplified structure to provide the synchronization acquiring function for rapidly searching the timing of the input pulse with higher accuracy and to keep the frequency in the analog-to-digital conversion to the lower frequency.

Second Embodiment

Figure 13:
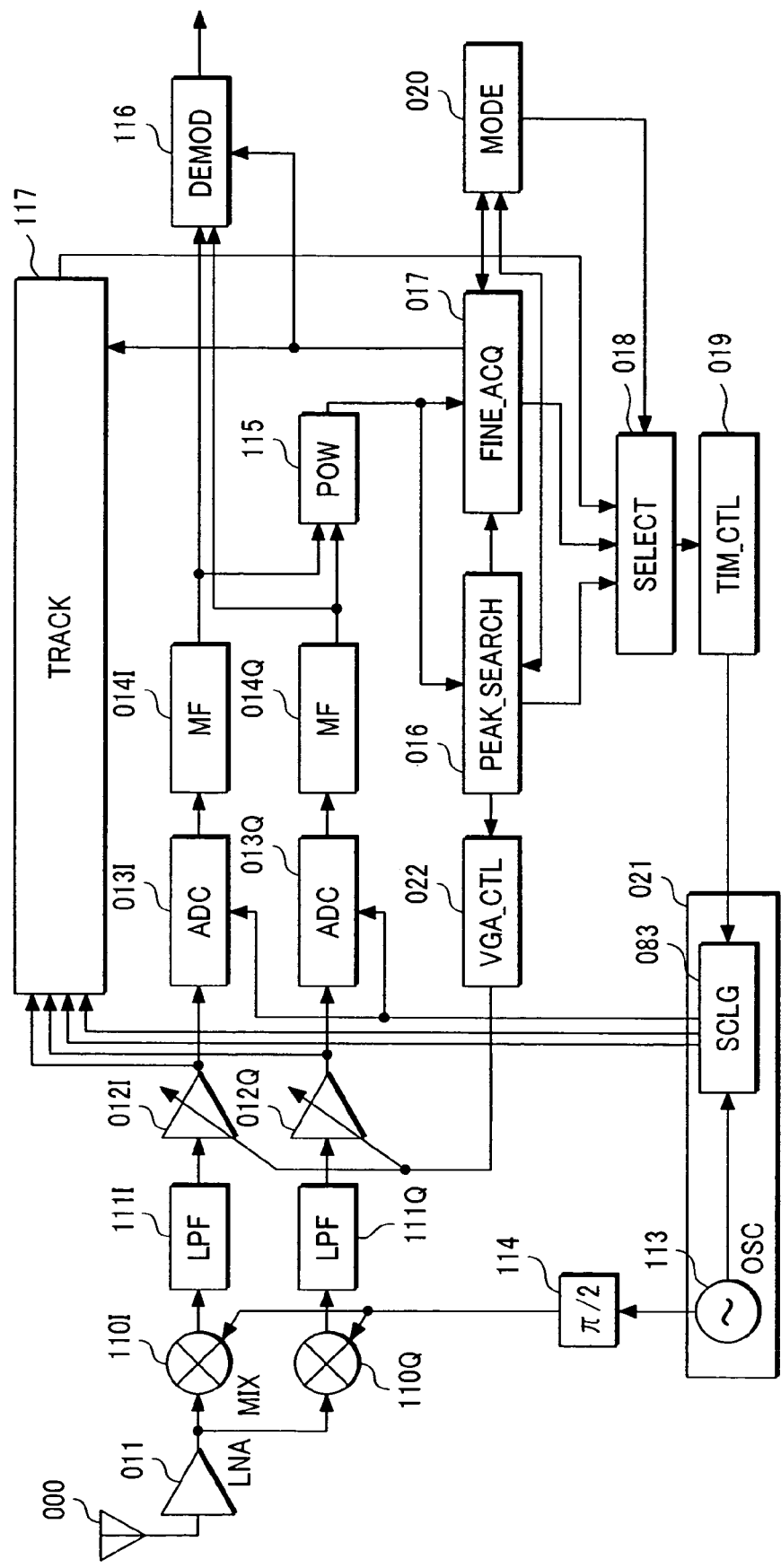
FIG. 13 is a structural diagram for explaining a second embodiment of the receiving apparatus in the present invention.

FIG. 13 is a schematic block diagram of the receiving apparatus in the second embodiment of the present invention. This embodiment is applied to a communication system for transmitting the signal using the modulated pulse waveform modulated obtained by modulating the carrier with the pulse waveform as shown in FIG. 26B transmitted, for example, by the transmitting apparatus shown in FIG. 25.

In FIG. 13, the receiving apparatus includes an antenna 000, a low-noise amplifier (LNA) 011, mixers 110I, 110Q, low-pass filters (LPFs) 111I, 111Q, variable gain amplifiers (VGAs) 012I, 012Q, analog-to-digital converters (ADCs) 013I, 013Q, matched filters (MFs) 014I, 014Q, an oscillator 113, a 90-degree phase shifter 114, a power calculator 115, a peak searcher 016, a detailed synchronization acquiring unit 017, a selector 018, a timing controller 019, a mode controller 020, a synchronous clock generator 083, a VGA controller 022, a demodulator 116 and a synchronization tracking unit 117.

In FIG. 13, the antenna 000, LNA 011, VGAs 012I and 012Q, ADCs 013I andO13Q, MFs 014I and 014Q, peak searcher 016, detailed synchronization acquiring unit 017, selector 018, timing controller 019, mode controller 020, VGA controller 022 have the functions similar to that of the antenna 000, LNA 011, VGAs 012 and 013, MF 014, peak searcher 016, detailed synchronization acquiring unit 017, selector 018; timing controller 019, mode controller 020 and VGA controller 022 in FIG. 1.

Moreover, the synchronous clock generator 083 in FIG. 13 has the function similar to that of the synchronous clock generator 083 in FIG. 6. In FIG. 13, the oscillator 113 and the synchronous clock generator 083 for supplying the signal to the mixers 110I, 110Q form the timing signal generator 021 in FIG. 1. The oscillator 113 is used in common as the 90-degree phase shifter 114, but these can also be provided independently without any limitation on the structure explained above.

Figure 25:
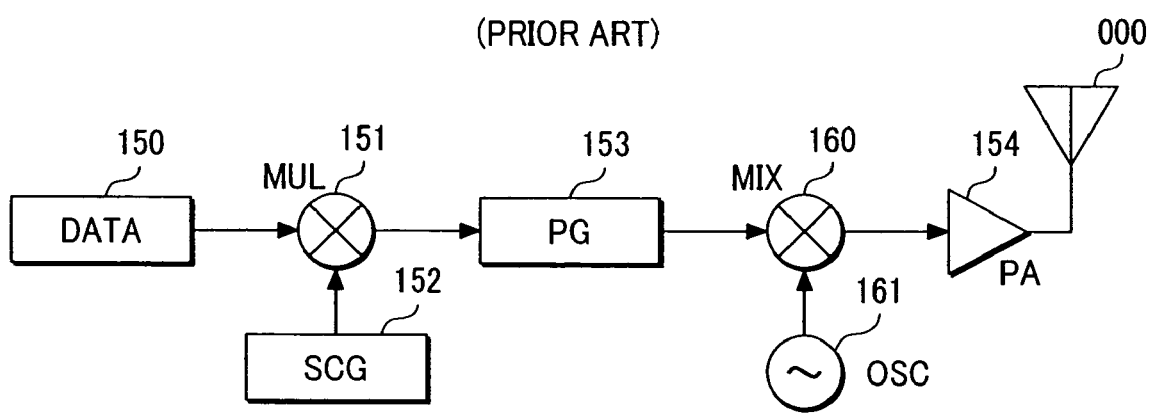
FIG. 25 is a structural diagram for explaining an example of the carrier-based direct sequence spread spectrum type UWB-IR transmitting apparatus.
Figure 26B:
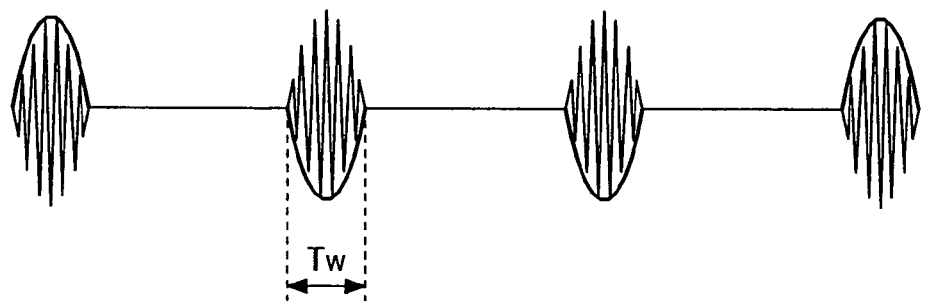
Figure 27:
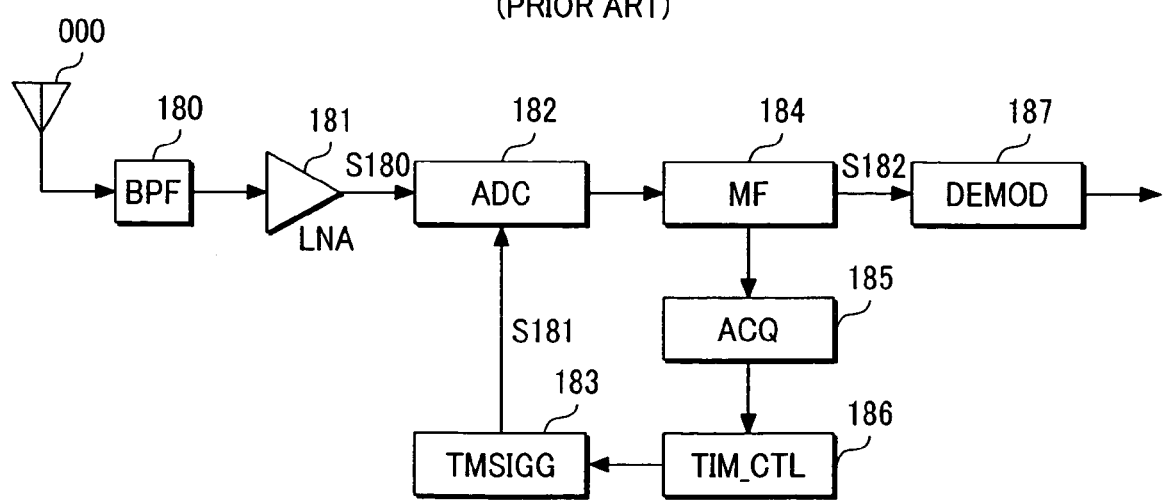
FIG. 27 is a structural diagram for explaining an example of the receiver for receiving the UWB-IR communication signal.
Figure 28:
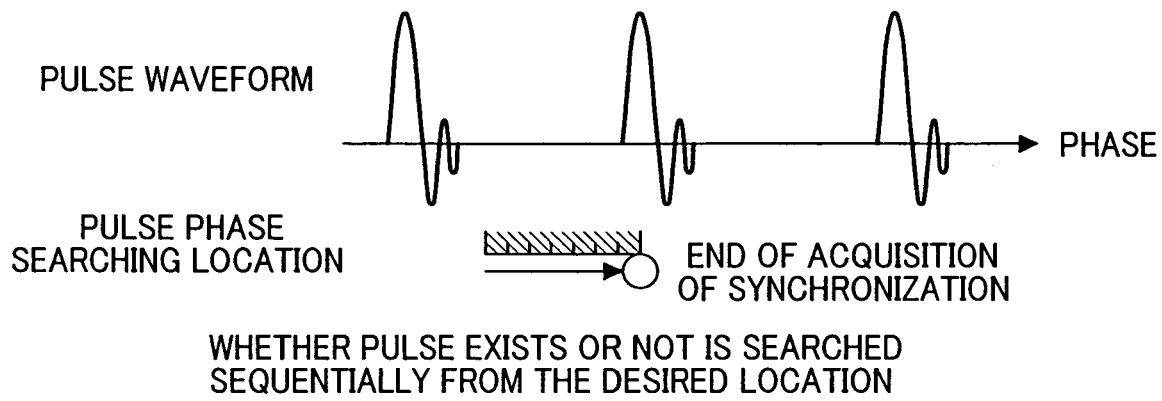
FIG. 28 is a schematic diagram for explaining a method to lock pulse synchronization using the sequential search method.

The LNA 011 in FIG. 13 amplifies, using the antenna 000, the BPSK-modulated and directly spread pulse train signal transmitted, for example, from the transmitting apparatus of FIG. 25. The oscillator 113 outputs the RF signal of the frequency equal to the carrier of the receiving pulse train and the signals respectively deviated in the phase by 90 degrees in the 90-degree phase shifter 114 are supplied to the mixers 110I, 110Q. The mixers 110I and 110Q multiply the pulse train of the LNA 011 and the RF signal, and the LPFs 111I, 111Q eliminate the harmonics and provide the baseband pulse train by extracting only the low frequency element. The baseband train is respectively amplified in the VGAs 012I, 012Q and the amplified baseband trains are then inputted to the ADCs 013I, 013Q.

Each element inputted to the ADC 013I, 013Q is converted to digital from analog in the timing of the clock signal outputted from the synchronous clock generator 083 and moreover despread with the matched filter having the spread code sequence like that conducted to the receiving signal in the MFs 014I, 014Q.

The power calculator 115 calculates the power (amplitude) element from two elements I and Q, and the power element is then inputted to the peak searcher 016.

Difference in the structures of the embodiments of FIG. 13 and FIG. 1 is that the receiving pulse train signal is divided into two quadrature elements in order to obtain the baseband pulse waveform from which the carrier has been eliminated and the signal inputted to the peak searcher 016 and detailed synchronization acquiring unit 017 becomes the two quadrature power (amplitude) elements as the outputs of the power calculator 115 in the embodiment of FIG. 13.

Detail procedures of initial acquisition of synchronization in the second embodiment are similar to that in the first embodiment explained with reference to FIG. 2A to FIG. 11.

Moreover, the synchronization tracking unit 117 monitors, after synchronization of the input pulse train and the conversion timing in the ADCs 013I, 013Q is once established by the acquisition of synchronization, the signals not to generate again deviation in timing and also controls the output timing of the timing signal generator 083.

Figure 14:
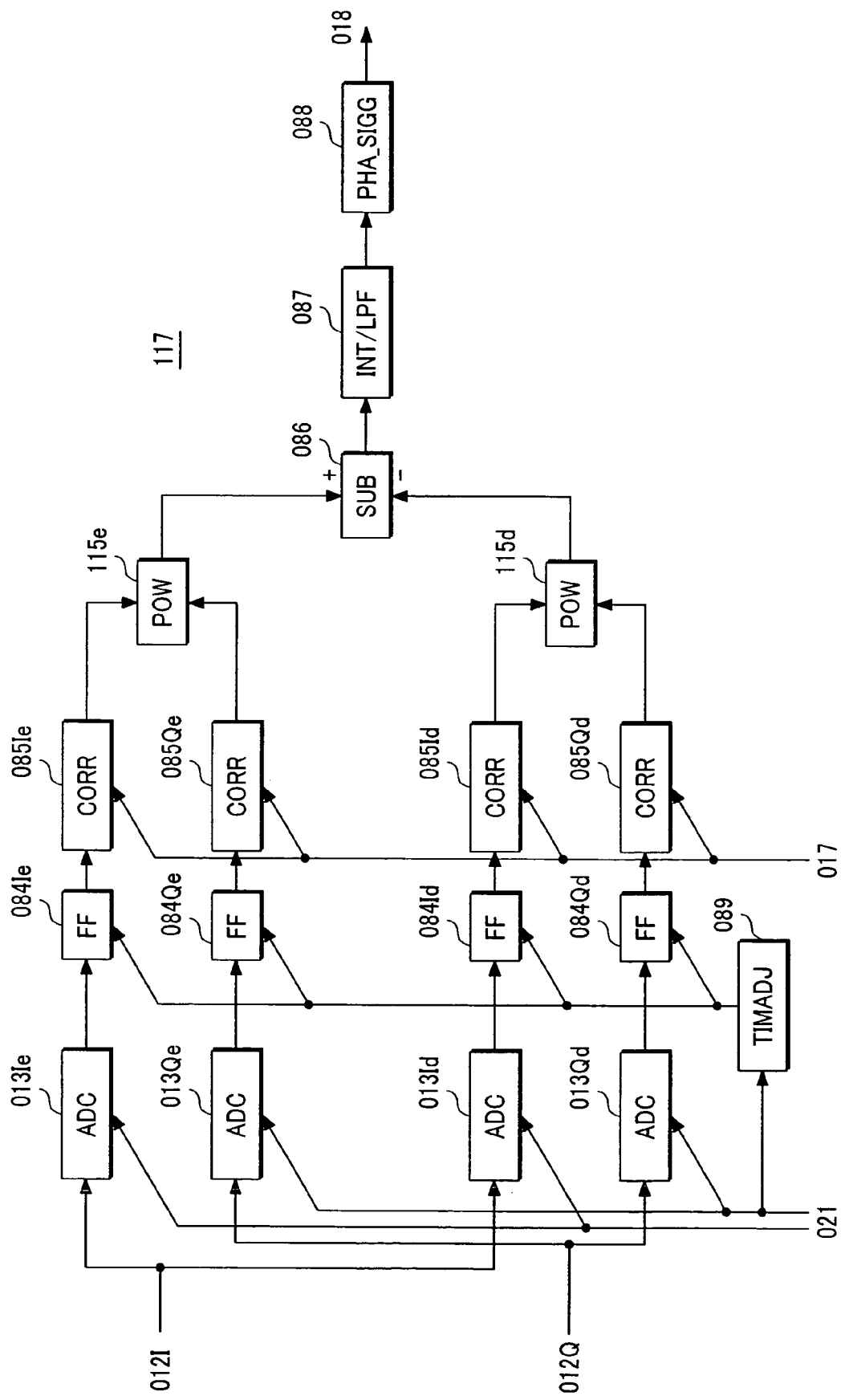
FIG. 14 is a schematic diagram for explaining an example of a structure of the schematic diagram for explaining an example of a structure of a synchronization acquiring unit in the second embodiment.

As an example of realizing the synchronization tracking function of DLL type is constituted with the timing signal generator 083, the timing controller 019 and a synchronization tracking unit 117. FIG. 14 shows a detail structure of the synchronization tracking unit 117.

In FIG. 14, the synchronization tracking unit 117 includes analog-to-digital converters (ADC) 013Ie, 013Id, 013Qe, 013Qd, flip-flop 084Ie, 084Id, 084Qe, 084Qd, code correlators 085Ie, 085Id, 085Qe, 085Qd, power calculator 115e, 115d, a subtractor 086, an integrator/low-pass filter 087, a phase control signal generator 088 and a timing adjusting unit 089.

In FIG. 14, the ADCs 013Ie, 013Id, 013Qe, 013Qd have the function similar to that of ADC 013 in FIG. 1, and the flip-flops 084Ie, 084Id, 084Qe, 084Qd; code correlators 085Ie, 085Id, 085Qe, 085Qd, subtractor 086, integrator/low-pass filter 087, phase control signal generator 088 and timing adjusting unit 089 have the function similar to that of the flip-flops 084Ie, 084Id, code correlators 085e, 085d, subtractor 086, integrator/low-pass filter 087, phase control signal generator 088, and timing adjusting unit 089, respectively.

Moreover, the power calculators 115e, 115d in FIG. 7 have the function similar to that of the power calculator 115 in FIG. 13.

The difference in FIG. 13 from FIG. 7 is that the DLL function may be established by respectively calculating the power elements of the signals of I, Q elements obtained in the conversion timing of the leading phase and the signals of I, Q elements obtained in the conversion timing of the delayed phase in the ADC 013I, ADC 013Q and then obtaining difference between both power elements.

According to this embodiment, the lower consumption UWB-IR receiver can be realized by employment of the structure and function explained above. The receiver of this embodiment enables rapid and highly accurate acquisition of synchronization even when oscillation frequency deviation exists between the transmitter and the receiver without influence of the multi-path environment and frequency characteristic of the receiver even while using low-rate analog-to-digital conversion when the pulse train modulated with the carrier is received.

Third Embodiment

Figure 15:
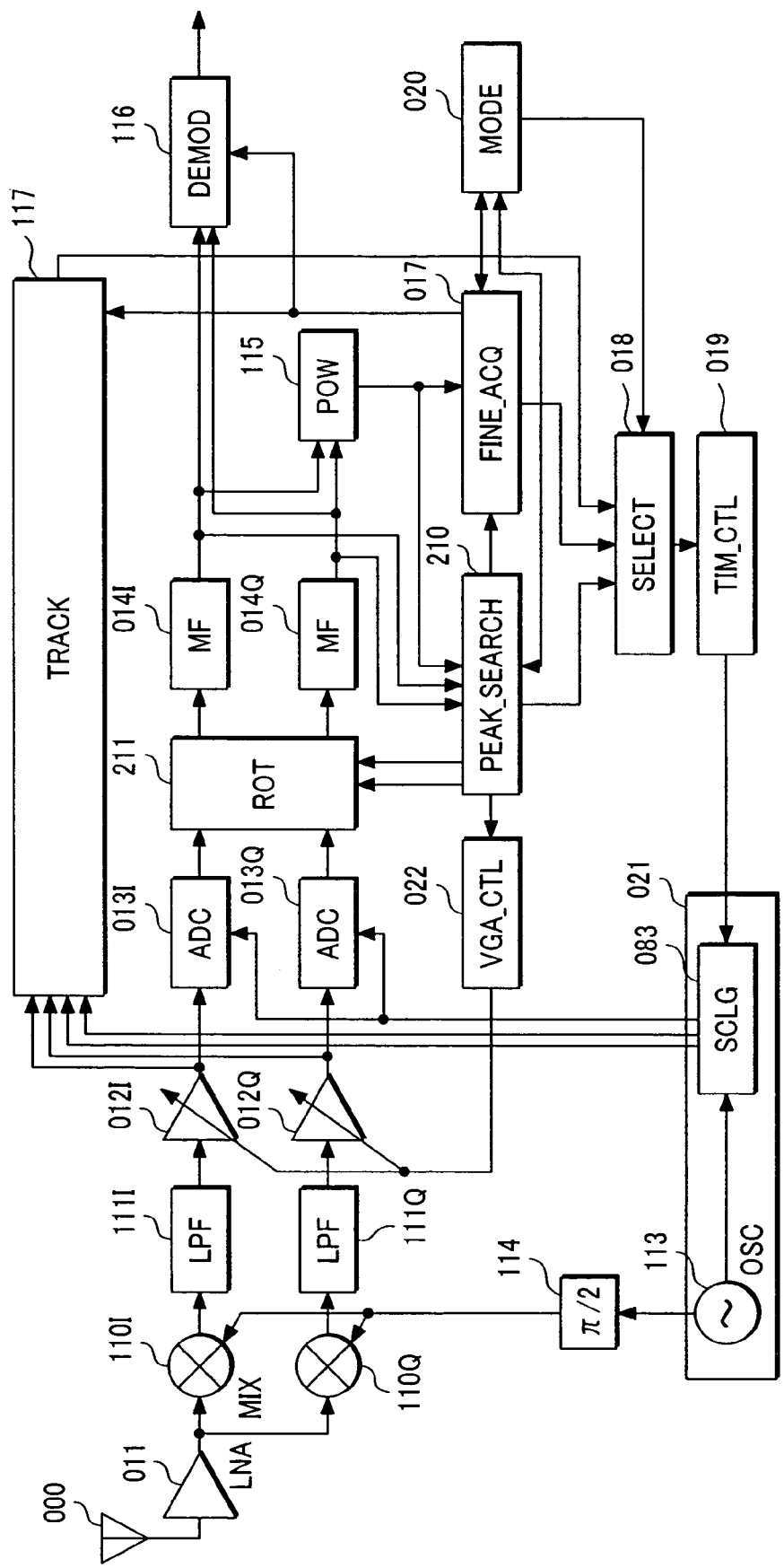
FIG. 15 is a structural diagram for explaining a third embodiment of the receiving apparatus in the present invention.

The third embodiment of the receiving apparatus of the present invention will be explained with reference to FIG. 15, FIG. 16, and FIG. 17. FIG. 15 is a schematic block diagram of the receiving apparatus in the third embodiment of the present invention. This embodiment is applied, for example, to a communication system for transmitting the signal using the modulated pulse waveform obtained by modulating the carrier with the pulse waveform as shown in FIG. 26B transmitted from the transmitting apparatus of FIG. 25.

In FIG. 15, the receiving apparatus includes an antenna 000, a low-noise amplifier(LNA) 011, mixers 110I, 110Q, low-pass filters (LPFs) 111I, 111Q, variable gain amplifiers (VGAs) 012I, 012Q, analog-to-digital converters (ADCs) 013I, 013Q, matched filters (MFs) 014I, 014Q, an oscillator 113, a 90-degree phase shifter 114, a power calculator 115, a peak searcher 210, a phase rotator 211, a detailed synchronization acquiring unit 017, a selector 018, a timing controller 019, a mode controller 020, a synchronous clock generator 083, a VGA controller 022, a demodulator 116 and a synchronization tracking unit 117.

The antenna 000, LNA 011, VGA 012I, 012Q, ADC 013I, 013Q, MF 014I, 014Q, detailed synchronization acquiring unit 017, selector 018, timing controller 019, mode controller 020, VGA controller 022, synchronization tracking unit 117 in FIG. 15 have the function identical to that of the antenna 000, LNA 011, VGA 012I, 012Q, ADC 013I, 013Q, MF 014I, 014Q, detailed synchronization acquiring unit 017, selector 018, timing controller 019, mode controller 020, VGA controller 022, and synchronization tracking unit 117 of FIG. 13.

Moreover, the synchronous clock generator 083 in FIG. 15 has the function similar to that of the synchronous clock generator 083 of FIG. 6. In FIG. 15, the timing signal generator 021 of FIG. 1 is constituted with the oscillator 113 and synchronous clock generator 083 for supplying the signals to the mixers 110I and 110Q and the oscillator 113 is used in common but this oscillator may be used independently without restriction to the structure explained above.

The peak searcher 210 as the function similar to that of the peak searcher 016 of FIG. 13 and the frequency deviation estimating function and the phase rotator 211 rotates the phases of the I and Q elements of the receiving signal by conducting complex multiplication on the basis of the phase rotating function supplied from the peak searcher 210.

Figure 16:
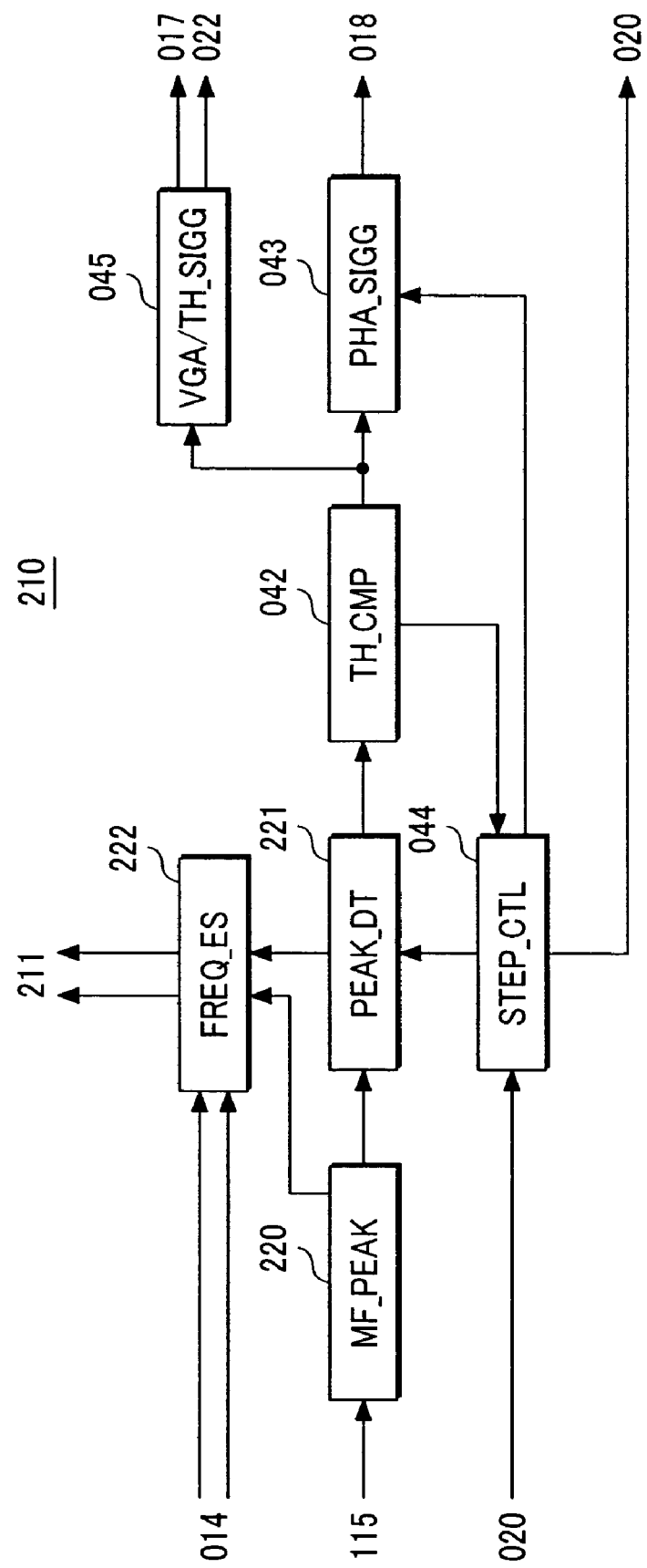
FIG. 16 is a schematic diagram for explaining an example of a structure of the peak searcher in a third embodiment.

FIG. 16 shows a structure of the peak searcher 210 of FIG. 15. In FIG. 16, the peak searcher includes a MF peak detector 220, a peak detector 221, a threshold value determining unit 042, a phase control signal generator 043, a step number controller 044, a VGA/threshold value control signal generator 045 and a frequency deviation estimating unit 222.

The threshold value determining unit 042, phase control signal generator 043, step number controller 044, VGA/threshold value control signal generator 045 in FIG. 16 have the function similar to that of the threshold value determining unit 042, phase control signal generator 043, step number controller 044, VGA/threshold value control signal generator 045 of FIG. 4. Moreover, the MF peak detector 220 and peak detector 211 have the function similar to that of the MF peak detector 040 and peak detector 041 of FIG. 4 and also output respective peak timing information.

The frequency deviation estimating unit 222 estimates frequency deviation between the carrier frequency in the transmitting signal and the oscillation frequency of the oscillator 113 of FIG. 15. The frequency deviation estimating value using the receiving signal in the peak timing is outputted to the phase rotator 211 as the phase rotating information using the peak timing information.

Figure 17:
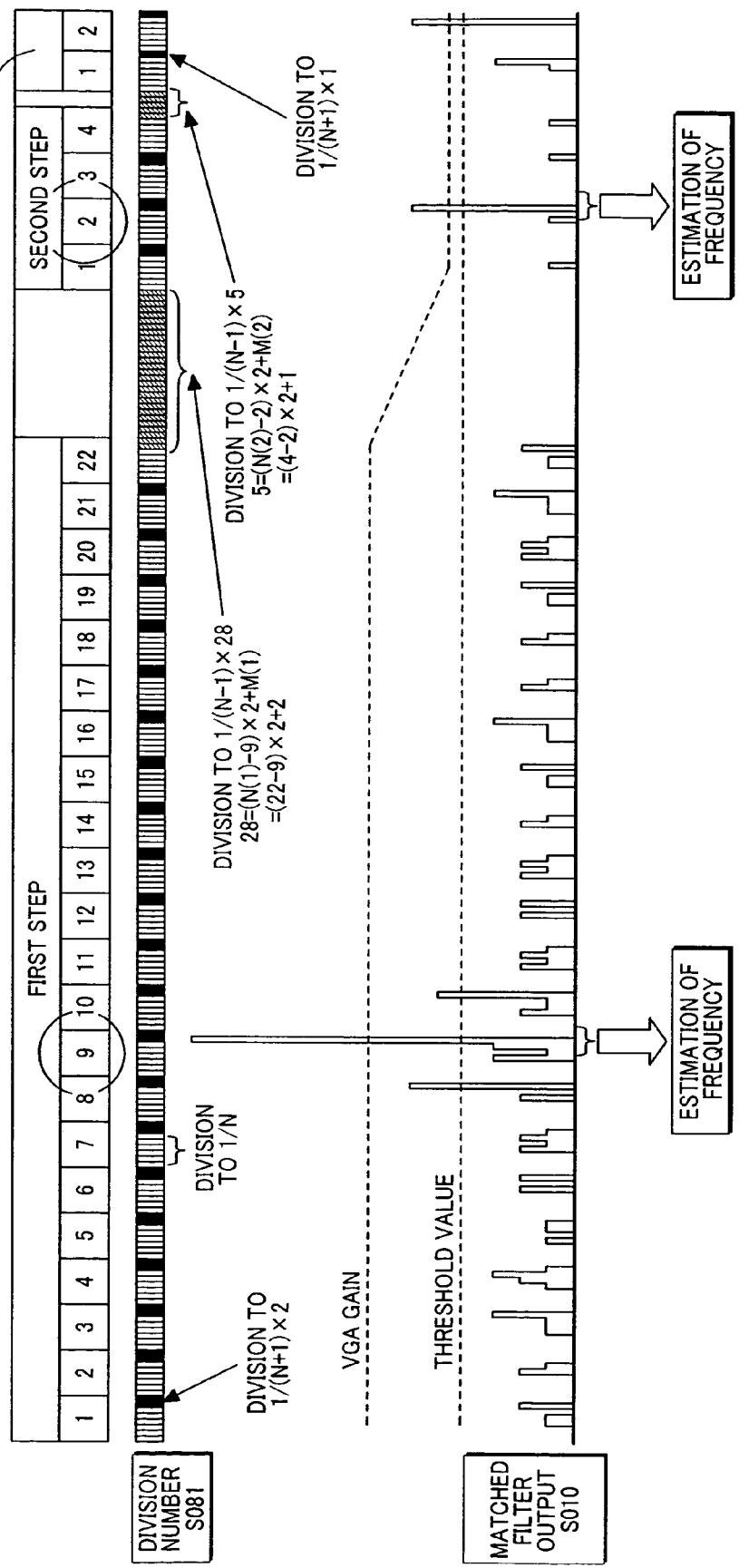
FIG. 17 is a diagram for explaining timing for estimating frequency deviation in the third embodiment.

FIG. 17 shows an example of operations in the structure shown in FIG. 16 under the condition similar to that of FIG. 11A. That is, the number of peak search steps STEP is 2, spread code length is 4, search resolution in peak search is 2×δ, search resolution in acquisition of detailed synchronization is 1×δ, number of phase searches N(1) and N(2) in each step are 22, and 2, the ranges of estimated region M(1) and M(2) in each step are 2, and 1.

Frequency deviation is estimated using the receiving signal in the peak timing in the first step and the second step and further acquisition of detailed synchronization is further conducted on the basis of the result of estimation.

Use of the structure explained above enables successful reception of signals by estimating frequency deviation even in the case where the carrier frequency in the transmitting signal is different from the oscillation frequency in the receiver.

Fourth Embodiment

The fourth embodiment of the receiving apparatus of the present invention will be explained with reference to FIG. 18 and FIG. 19.

Figure 18:
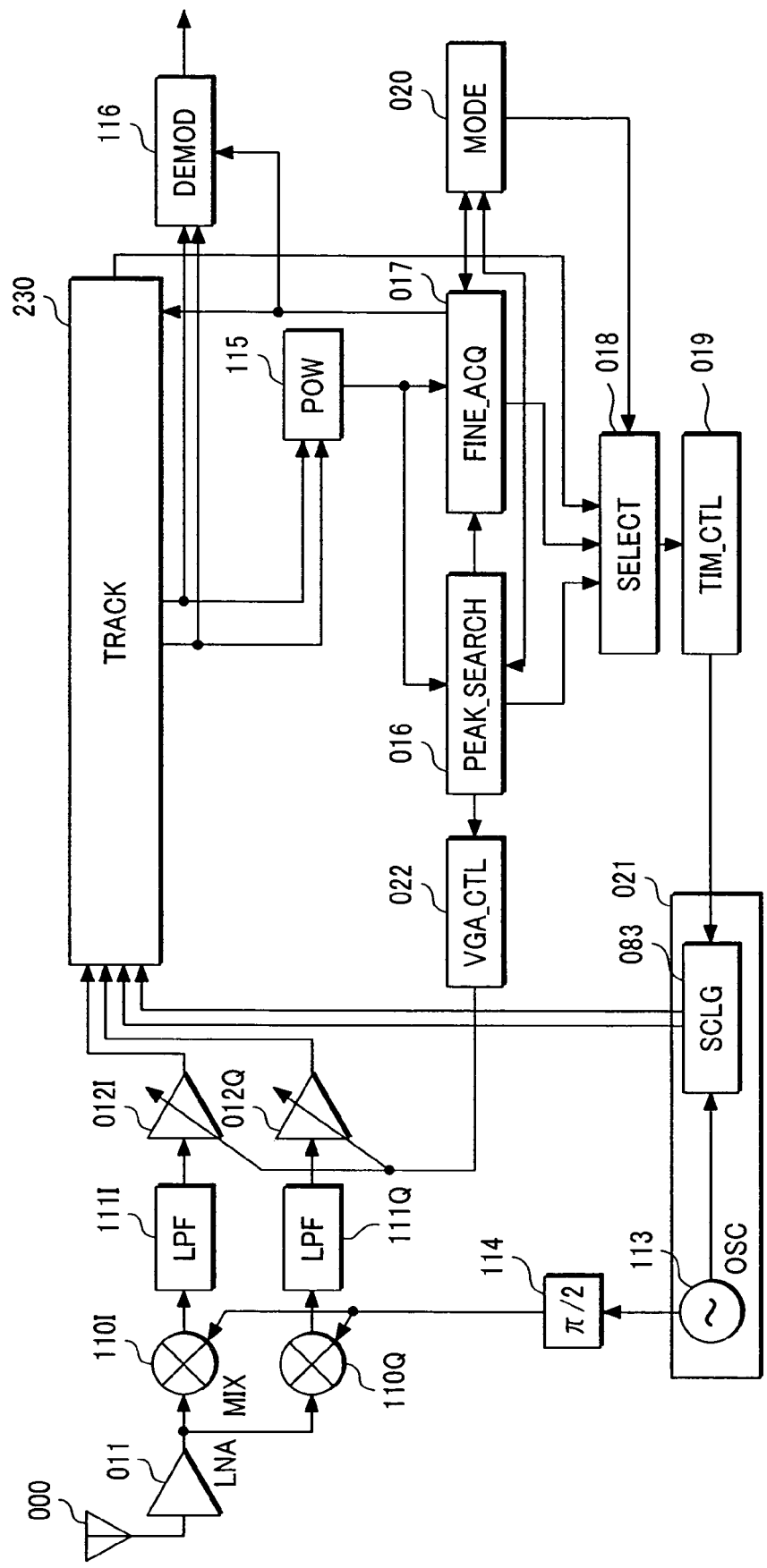
FIG. 18 is a structural diagram for explaining a fourth embodiment of the receiving apparatus in the present invention.

FIG. 18 is a schematic block diagram of the receiving apparatus in the third embodiment of the present invention. This embodiment is applied to a communication system for transmitting the signal using the modulated pulse waveform obtained by modulating the carrier with the pulse waveform as shown in FIG. 26B transmitted by the transmitting apparatus shown, for example, in FIG. 25.

In FIG. 18, the receiving apparatus includes an antenna 000, a low-noise amplifier (LNA) 011, mixers 110I, 110Q, low-pass filters (LPFs) 111I, 111Q, variable gain amplifiers (VGAs) 012I, 012Q, an oscillator 113, a 90-degree phase shifter 114, a power calculator 115, a peak searcher 016a detailed synchronization acquiring unit 017, a selector 018, a timing controller 019, a mode controller 020, a synchronous clock generator 083, a VGA controller 022, a demodulator 116 and a synchronization tracking unit 230.

The antenna 000, LNA 011, VGA 012I, 012Q, peak searcher 016, detailed synchronization acquiring unit 017, selector 018, timing controller 019, mode controller 020, VGA controller 022 in FIG. 18 have the function similar to that of the antenna 000, LNA 011, VGA 012I, 012Q, ADC 013I, 013Q, MP 014I, 014Q, peak searcher 016, detailed synchronization acquiring unit 017, selector 018, timing controller 019, mode controller 020 and VGA controller 022 in FIG. 13.

The synchronous clock generator 083 in FIG. 18 has the function similar to that of the synchronous clock generator 083 in FIG. 6. In FIG. 18, the oscillator 113 and synchronous clock generator 083 for supplying the signal to the mixers 110I, 110Q form the timing signal generator 021 in FIG. 1 and the oscillator 113 is used in common but the oscillator 113 can also be used independently without limitation to the structure explained above.

The synchronization tracking unit 230 has the function similar to that of the synchronization tracking unit 117 in FIG. 13 and the function to synthesize the synchronization acquisition signal and demodulating signal respectively in I and Q elements.

An example of a structure of the synchronization tracking unit 230 will be explained in detail with reference to FIG. 19. In FIG. 19, the synchronization tracking unit 230 includes analog-to-digital converters (ADCs) 013Ie, 013Id, 013Qe, 013Qd, flip-flops (FFs) 084Ie, 084Id, 084Qe, 084Qd, matched filters (MFs) 014Ie, 014Id, 014Qe, 014Qd, selectors 241Ie, 241Id, 241Qe, 241Qd, power calculators 115e, 115d, a subtractor 086, an integrator/low-pass filter 087, a phase control signal generator 088, a timing adjusting unit 089 and signal synthesizers 242I, 242Q.

Figure 19:
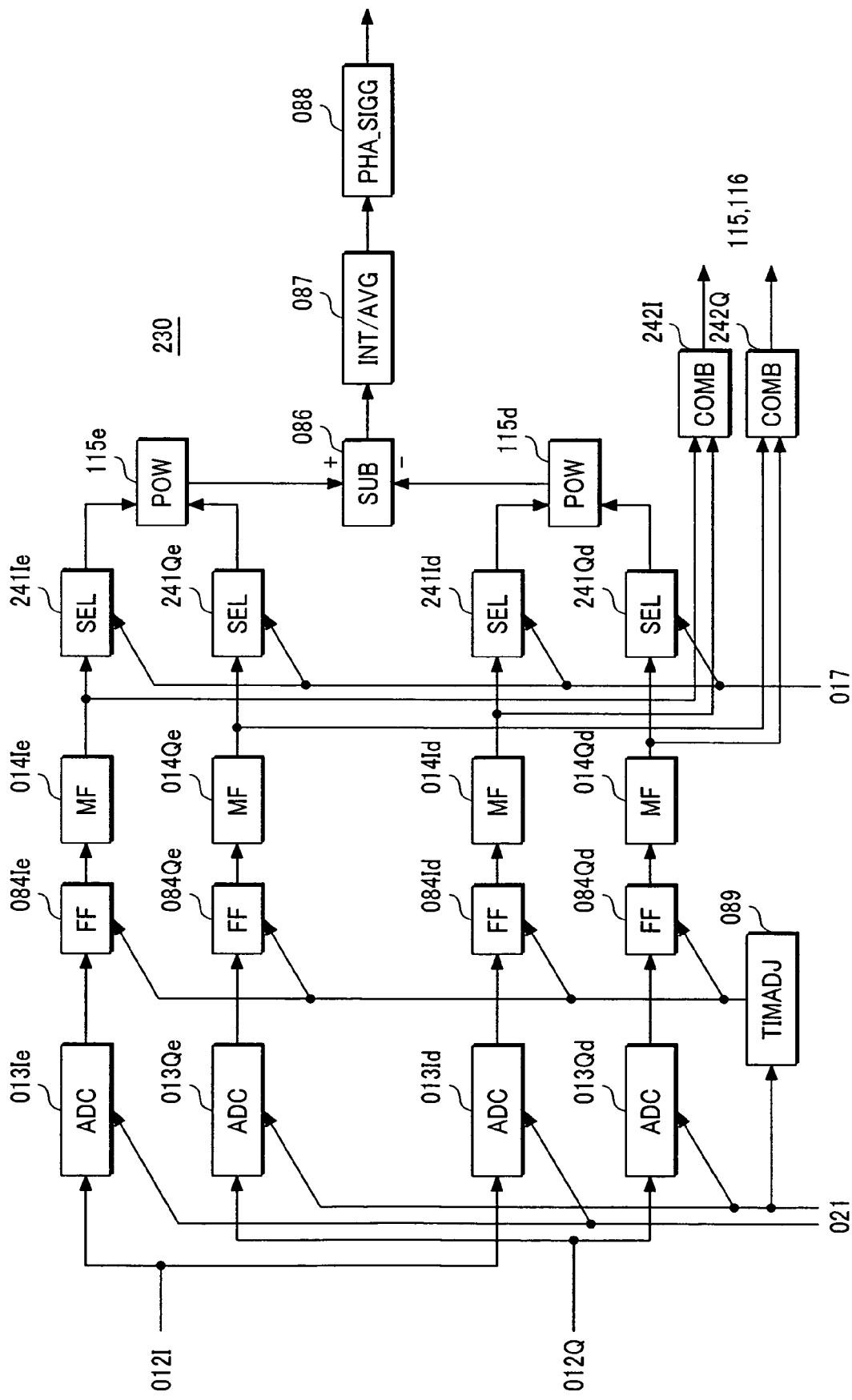
FIG. 19 is a schematic diagram for explaining an example of a structure of the synchronization tracking unit in the fourth embodiment.

In FIG. 19, the ADCs 013Ie, 013Id, 013Qe, 013Qd; flip flops 084Ie, 084Id, 084Qe, 084Qd, power calculators 115e, 115d, subtractor 086, integrator/low-pass filter 087, phase control signal generator 088, timing adjusting unit 089 have the function similar to that of the ADCs 013Ie, 013Id, 013Qe, 013Qd, flip flops 084Ie, 084Id, 084Qe, 084Qd, power calculators 115e, 115d, subtractor 086, integrator/low-pass filter 087, phase control signal generator 088 and timing adjusting unit 089 in FIG. 14. Moreover, the MFs 014Ie, 014Id, 014Qe, 014Qd have the function similar to that of the MF 014 in FIG. 1 and the selectors 241Ie, lo 241Id, 241Qe, 241Qd select the signals in the despreading timing of the respective signal paths. The despreading timing is supplied from the detailed synchronization acquiring unit 017. The MFs 014Ie, 014Id, 014Qe, 014Qd and selectors 241Ie, 241Id, 241Qe, 241Qd realize the function similar to that of the code correlators 085Ie, 085Id, 085Qe, 085Qd in FIG. 14.

With the structures explained above, the synchronization tracking function realized in FIG. 14 can also be realized.

The signal synthesizers 242I, 242Q outputs the synchronization acquiring signal and the synchronization demodulating signal respectively in the I and Q elements by synthesizing the phase leading signals (output of MF 014Ie and output of MF 014Qe) and the phase delayed signals (output of MF 014Id and output of MF 014Qd) after passing through the matched filter and these signals are then inputted to the power calculator 115 and demodulator 116.

The number of analog-to-digital converters can be reduced to realize low cost and low power consumption by generating the synchronization acquiring signal and demodulating signal from the synchronization tracking unit.

Fifth Embodiment

Figure 20:
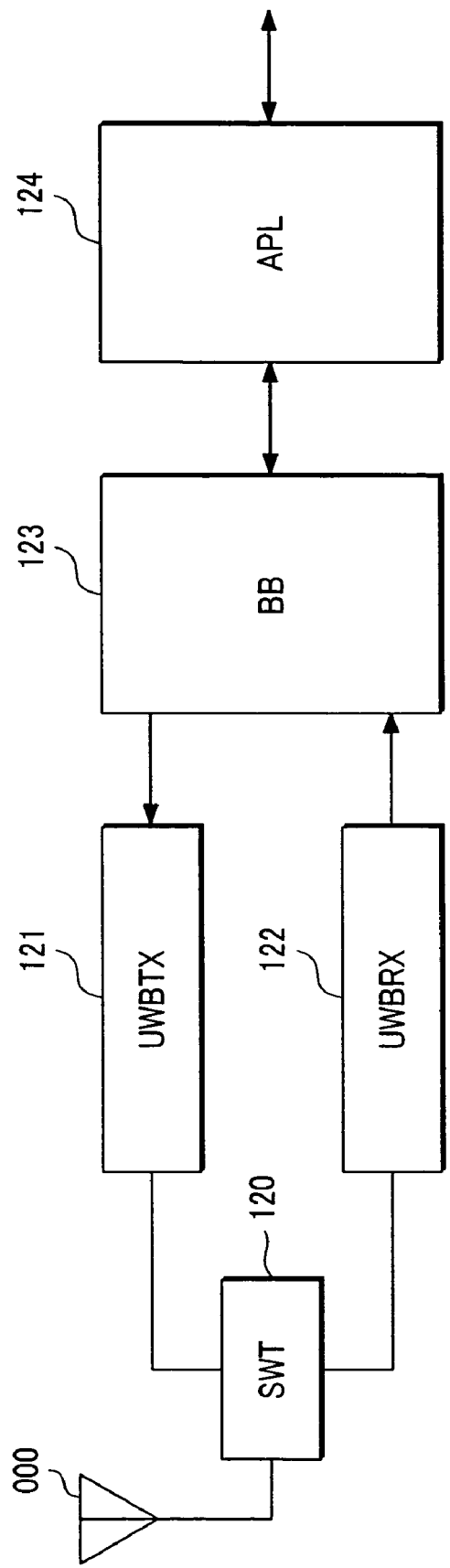
FIG. 20 is a diagram for explaining an example of a communication apparatus using the receiving apparatus in the present invention.

Next, an example of a communication apparatus (transmitter/receiver) using any of the receivers of the embodiments explained above is shown in FIG. 20 as an application example of the receiver of the present invention.

Here, the receiver includes an antenna 000, a switch 120, a UWB transmitter 121, a UWB receiver 122, a baseband unit 123 and an application unit 124. The baseband unit 122 receives the data to be transmitted from the application unit 123 and sends the transmitting data to the UWB transmitter 121 after the baseband process. The UWB transmitter 121 is the transmitter formed, for example, of the circuit of FIG. 24 or FIG. 25 and transmits the received data after conversion to the UWB-IR signal.

The UWB receiver 122 is formed of the receiver of the embodiments of the present invention. The demodulated data is sent to the baseband unit 123 and is used in the application unit 124 after the baseband process. The switch 120 is used for switching of the transmitting and receiving signals.

With employment of this structure, impulse-radio data communication can be realized in the simplified structure with low power consumption. As explained above, since the low power consumption UWB communication apparatus can be realized with a simplified structure, a new application which has been difficult in the radio communication system of the related art from the viewpoint of power consumption and cost can be expected. An application example thereof will be explained below.

Six Embodiment

Figure 21:
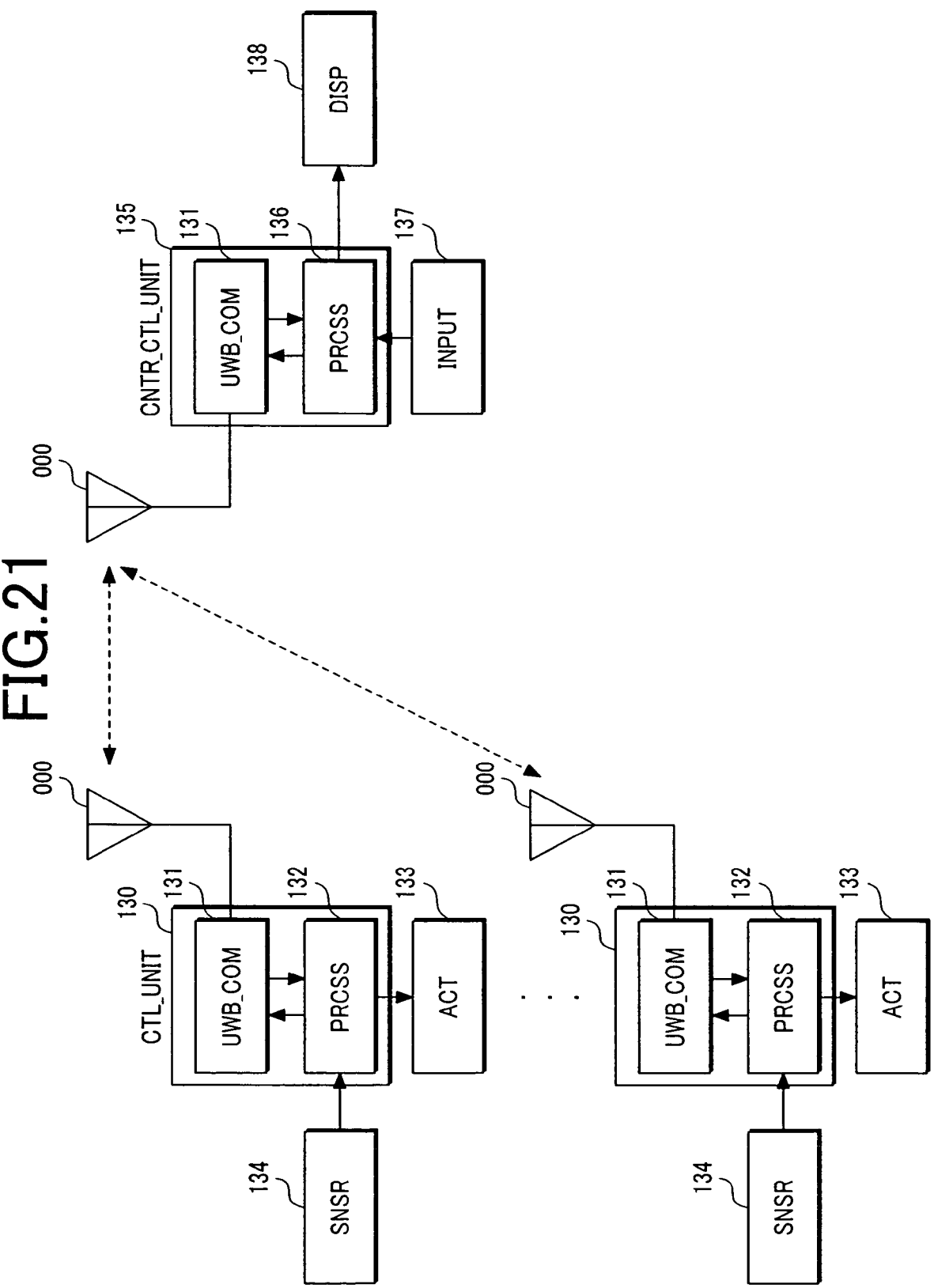
FIG. 21 is a schematic diagram for explaining an example of a structure of application using the communication apparatus utilizing the receiving apparatus in the present invention.

FIG. 21 shows an example of a structure of application utilizing a communication apparatus comprising the receiving apparatus of the present invention. The communication apparatus includes an antenna 000, a controller 130, a UWB communication apparatus 131, a processor 132, an actuator 133, a sensor 134, a central processing unit (CPU) 135, a processor 136, an input apparatus 137 and a display apparatus 138.

A profile shown in FIG. 21 is a star type structure assuming an application such as a sensor network. First, the controller 130 is formed of the UWB communication apparatus 131, for example, of the fifth embodiment to which the present invention is applied and the processor 132. This processor 132 is connected to the sensor 134 and actuator 133. The data obtained from the sensor 134 can be processed arithmetically and is then transmitted by the UWB communication apparatus 131. Moreover, the processor 132 processes the instruction information received with the UWB communication apparatus 131 in order to drive the actuator 133.

The central processing unit (CPU) 135 is formed of the UWB communication apparatus 131 of the fifth embodiment to which the present invention is applied and the processor 136 and receives the information from a plurality of controllers 130 through radio communication or transmits the information. The input apparatus 137 receives an input from users, transfers the input to the processor 136, while the display apparatus displays the information processed with the processor 136 or the like to users.

The sensor network explained above is essentially provided with the wireless function and is required to show low cost and low power consumption of the transmitting apparatus and receiving apparatus. Therefore, the UWB-IR communication to which the present invention is applied can provide a large merit. Moreover, the star type network structure has been introduced here but the multi-hop and ad-hock profiles can also be realized by utilizing the low cost and low power consumption UWB-IR communication to which the present invention is applied.

Seventh Embodiment

Figure 22:
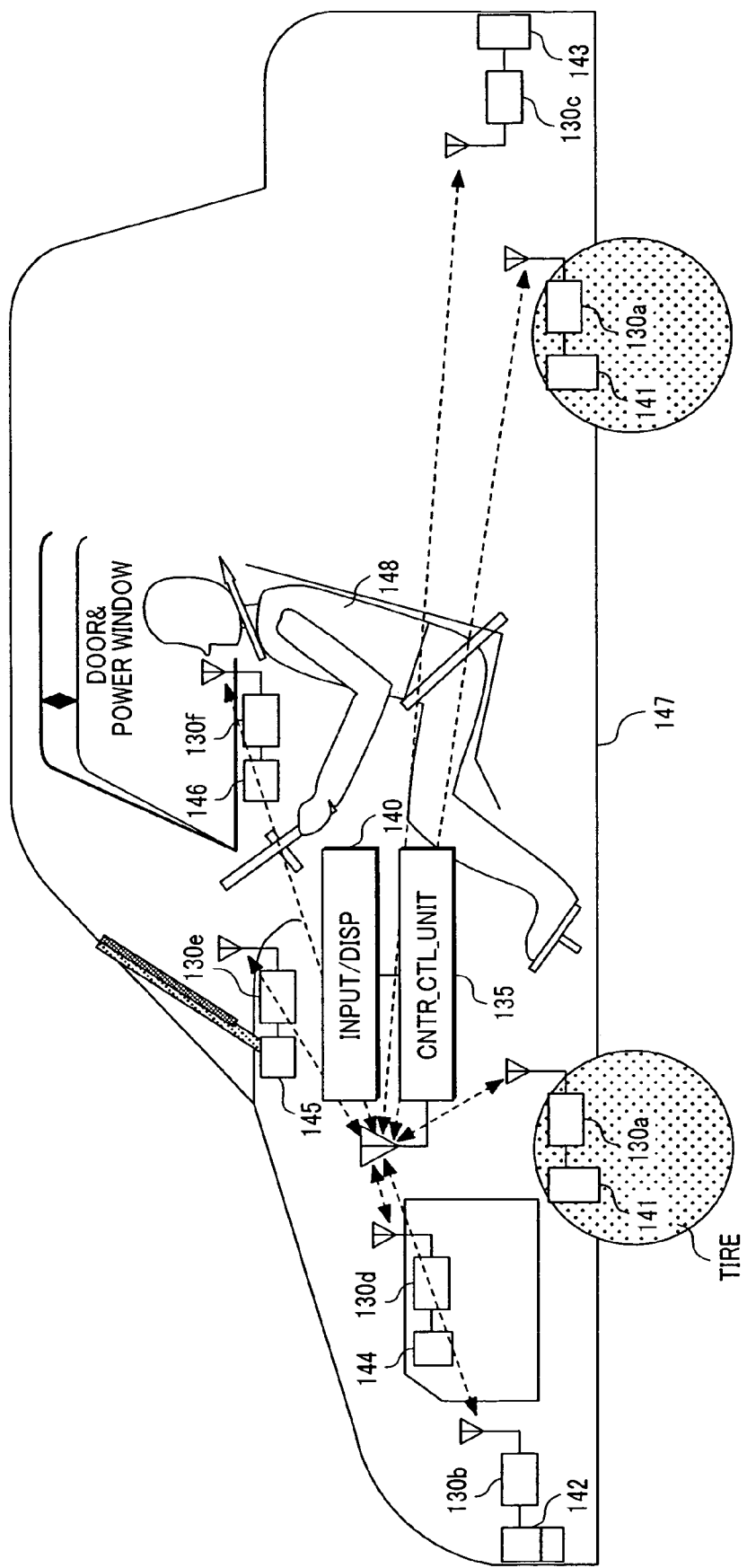
FIG. 22 is a schematic diagram for explaining an application example using the communication apparatus utilizing the receiving apparatus in the present invention.
Figure 23:
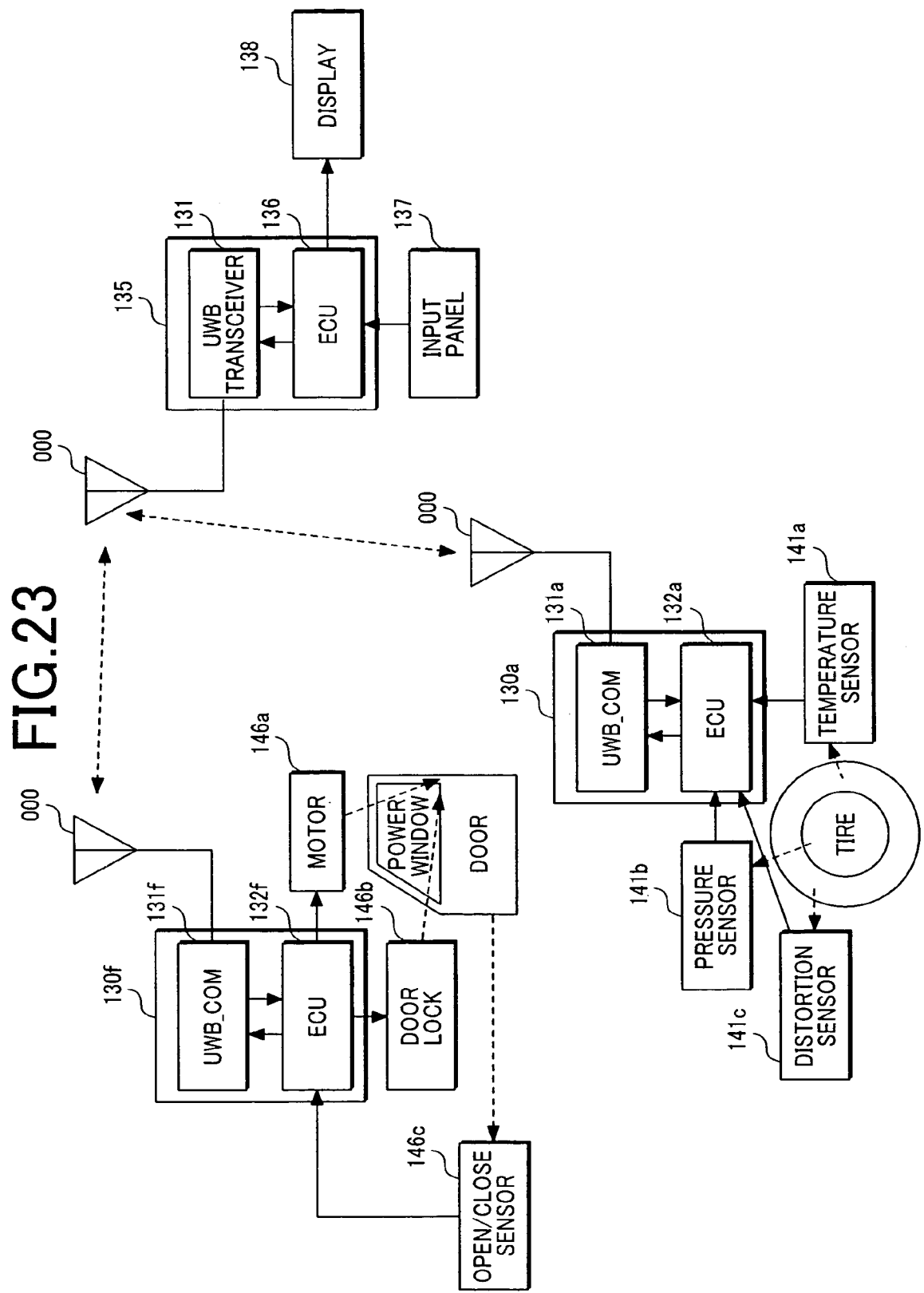
FIG. 23 is a diagram for explaining the more concrete structure in the example of FIG. 22 on the basis of examples of tires and doors.

Moreover, an example where the communication system of the present invention is applied to an automobile is shown in FIG. 22 and FIG. 23. FIG. 22 is an example of the structure of a mobile mounting system where the application using the receiving apparatus of the present invention is adapted to an automobile. FIG. 23 is an example of the concrete structure in regard to the application into tires and doors in FIG. 22.

In FIG. 22, the communication system includes controllers 130a to 130f, sensor actuators having the particular functions 141 to 146, a central processing unit (CPU) 135 and an input/output apparatus 140. The controller 130 and CPU 125 of FIG. 21 are used as the controllers 130a to 130f and CPU 125. The CPU and each controller include, for example, a processor, a memory such as ROM and RAM, and an application program stored in the memory and are controlled with a microcomputer comprising a communication process function.

In FIG. 22, 141 denotes a sensor for tires to sense temperature, air pressure, and distortion of tire of an automobile 147. Information of such data is transmitted by the UWB-IR radio communication to the CPU 125 from the controller 130a provided with the function to monitor the pressure of tire. This information is also processed with the processor and is then displayed on the input/display apparatus 140 as the tire pressure monitoring data. Moreover, it is also possible to use the sensor 141 as a wheel velocity sensor for sensing the number of rotations of each wheel. Therefore, the signals obtained may be used for control of wheel through operation of the actuator provided for controlling the brake.

In FIG. 22, 142 denotes a front lamp actuator for operating a headlight and an indicator. Manipulation information is inputted by a driver 148 from the input/display apparatus 140. This manipulation information is generated as an instruction for actuator control through the process in the processor of the CPU 135. This manipulation information transmitted to the controller 130b with the UWB-IR radio communication operates the headlight and indicator. When the signal is received through the UWB-IR radio communication between the CPU and each controller, the peak search process, detailed synchronization acquisition process, demodulation process and synchronization tracking process are executed in the procedures shown in FIG. 3.

143 denotes a tail lamp actuator for operating a tail lamp and an indicator. The manipulation information is inputted by a driver 148 from the input/display apparatus 140. This manipulation information is generated as an instruction for actuator control through arithmetic process by the processor in the CPU 135 and the instruction transmitted to the controller 130c by the UWB-IR radio communication operates the tail lamp and indicator.

144 denotes a sensor provided in an engine room to sense temperature of coolant in the engine room, a battery voltage, remainder of oil or an output state of an indicator such as a power generating motor. Information of these data is sent to the CPU 135 by the UWB-IR radio communication and is then processed in the processor. The processed data is used as the control information of the automobile or displayed on the input/display apparatus 140 as the monitoring data.

145 denotes a wiper actuator for operating the windshield wiper. The manipulation information is inputted by a driver 148 from the input/display apparatus 140. This manipulation information is generated as the instruction for actuator control through the arithmetic process in the processor of the CPU 135 and the instruction transmitted to the controller 130e by the UWB-IR radio communication operates the windshield wiper.

146 denotes a door actuator for operating a power window and a door lock. The manipulation information is inputted by a driver 148 from the input/display apparatus 140. The instruction transmitted to the controller 135 by the UWB-IR radio communication from the CPU 125 operates the power window and the door lock. Moreover, the door actuator 146 uses an open/close sensor and the door open/close information is sent to the CPU 135 by the UWB-IR radio communication from the controller 130f and is then displayed on the input/display apparatus 140.

FIG. 23 is provided for explaining a more concrete structure of the embodiment of FIG. 22 using an example of the tire and door.

In FIG. 23, 000 denotes an antenna; 130a and 130f denote controllers, 131, 131a and 131f denote UWB communication apparatuses, 132a, 132f and 136f denote control unit, 135 denotes a central processing unit CPU, 137 denotes an input apparatus, 138 denotes a display, 141a denotes a temperature sensor, 141*b* denotes an air pressure sensor, 141*c* denotes a distortion sensor, 146*a* denotes a motor, 146*b* denotes a door lock apparatus and 146*c* denotes a door open/close sensor, respectively.

The sensors 141*a*, 141*b*, 141*c* provided to each tire of the front wheels and rear wheels respectively measure temperature, air pressure, and distortion of tires and the information of these data is then sent to the control unit 132*a* of the controller 130*a* provided corresponding to each tire. The control unit 132*a* generates detection data indicating state of air pressure and state of temperature in the tire. The tire information attained by adding a sensor ID as the peculiar identification information of the controller 130*a* to such data is transmitted to the CPU 135 by the UWB-IR radio communication via the UWB communication apparatus 131*a*. The control unit 136 of the CPU receives such tire pressure information and judges state of tire characterized by the sensor ID. For example, whether the air pressure of particular tire is lowered than the specified value or whether tire temperature rises exceeding the specified value. Result of judgment is displayed on the display 138. Particularly when the air pressure of tire is lowered than the specified value or tire temperature rises exceeding the specified value, warning is necessary. Therefore, if such irregular state occurs, warning to the driver is displayed on the display 138.

Moreover, the instruction inputted by a driver from the input apparatus 137 is processed in the control unit 136 and is then transmitted to the UWB communication apparatus 131*f* via the UWB communication apparatus 131 as the manipulation information formed of the information including instruction and the actuator ID. The manipulation information transmitted is processed by the control unit 132*f* to operate the motor 146*a* as the door actuator in order to open and close the power window. Or, this manipulation information operates also the door lock apparatus 146*b* as the door actuator for lock and unlock of door. Moreover, the open/close sensor 146*c* detects the door opening and closing state. The control unit 132*f* acquires the door open/close information and the data formed of the door open/close information and the sensor ID is transmitted to the controller 135 from the UWB communication apparatus 131*f*. The control unit 136 displays the information received on the display 138 when the door is opening.

The controller 135 may also be constituted to include the input apparatus 137 and the UWB communication apparatus, and is also constituted as a mobile terminal, having a door-key function, for the door lock to be manipulated using the ID information for identifying a driver in order to remotely open/close and lock/unlock the door when the driver manipulates the door actuator from the communication area located in the outside of an automobile.

The present invention can be applied widely for various controls and sensing operations other than that explained above and such wireless control and sensing operation eliminates troublesome wires during manufacture of automobiles and also enables remarkable reduction of weight shared by the wires.

Moreover, an automobile is usually placed under the communication environment which is easily subjected to multipath and noise of disturbance. Therefore, application into the mobile mounting system of the radio communication of lo the related art results in a problem from the viewpoints of reliability, cost and power consumption. The UWB-IR radio apparatus of the present invention comprises the synchronization acquiring function and synchronization tracking function for rapidly and more accurately searching the timing of input pulse of the quick and high accuracy ultra-wideband signal. Therefore, even when the present invention is applied to the mobile mounting system, highly reliable communication may be realized because of the simplified structure, low power consumption, and strength for multi-path and noise of disturbance. Namely, application of the UWB-IR radio apparatus of the present invention can provide highly reliable control and sense functions by radio as the system for an automobile. In addition, the present invention can also provide a low-cost and low-power consumption system using a lower frequency for the analog to digital conversion.

What is claimed is:

1. A receiving apparatus for sampling and receiving a transmitting signal transmitted based on a communication system for exchanging information with an intermittent pulse train signal in a nominal pulse repetition frequency or an integer times thereof, the receiving apparatus comprising:
an initial synchronization acquiring device for synchronizing a sampling timing of a receiving signal to a pulse location or a pulse phase before demodulation of the receiving signal,
wherein the initial synchronization acquiring device comprises
a peak search function for holding a largest output value as a peak value by searching all phases corresponding to the frequency of the transmitting signal with a first search resolution, judging existence of the receiving signal from the peak value, and estimating a new peak phase estimated region from a phase region including phase of the peak value and being narrower than the all phases when the receiving signal exists; and
a detailed synchronization acquiring function for searching, in a second search resolution, the new peak estimated region estimated with the peak search function,
wherein the peak search function repeats a plurality of times of the processes for holding the largest output value as a peak value by searching all phases of the new peak phase estimated region with the first search resolution or a search resolution higher than the first search resolution and moreover estimating the new peak phase estimated region from the phase region including the phase of the peak value and being narrower than the peak phase estimated region, and
wherein the peak search function repeats the processes until the peak phase estimated region becomes equal to or narrower than a pulse width TW of the transmitting signal.

2. The receiving apparatus according to claim 1, further comprising:
an amplifier for amplifying the received transmitting signal in a predetermined amplification factor in a preceding stage of the peak search,
wherein the peak search function changes the amplification factor in accordance with the largest output value being held.

3. The receiving apparatus according to claim 1,
wherein the peak search function comprises a threshold value determining unit for determining existence of a signal in the peak search function or in the detailed synchronization acquiring function, and changes the threshold value in accordance with the largest output value being held.

4. The receiving apparatus according to claim 1,
wherein the second search resolution in the detailed synchronization acquiring function is set higher than the first search resolution in the peak search function.

5. The receiving apparatus according to claim 1,
wherein the output value inputted for the peak search and the detailed synchronization acquisition is an output of a matched filter having a spread code sequence same as that of the transmitting signal as a tap coefficient.

6. The receiving apparatus according to claim 1, further comprising:
a function for conducting sampling in a phase leading an original timing of sampling in the nominal pulse repetition frequency or in the frequency of the integer times thereof;
a function for conducting sampling in a phase delayed from the original timing;
a function for despreading the signals sampled in the leading and delayed phases using the spread code of the transmitting signal;
a function for obtaining a difference from the two despread signals; and
a function for controlling the timings of the three samplings from the difference signal.

7. The receiving apparatus according to claim 1,
wherein an output value inputted for the peak search and the detailed synchronization acquisition is a power element or an amplitude element calculated from a couple of outputs obtained by sampling the frequency-converted signal divided into two quadrature signals generated by multiplying the receiving signal with the signals deviated in the phase by 90 degrees having the carrier frequency of the transmitting signal and eliminating a high frequency element in the nominal pulse repetition frequency or the frequency of the integer times thereof and by inputting the same signal to a matched filter having a spread code of the transmitting signal as the tap coefficient.

8. The receiving apparatus according to claim 1, wherein the initial synchronization acquiring device obtains a clock for giving the timing of the sampling by dividing the frequency of the signal having the frequency equal to the integer times of the nominal pulse repetition frequency by a frequency dividing number, and
wherein the initial synchronization acquiring device conducts phase shift for the peak search and the detailed synchronization acquisition by varying the frequency dividing number.

9. The receiving apparatus according to claim 7,
wherein the initial synchronization acquiring device obtains a clock for giving the timing of sampling by dividing the frequency of the signal having the frequency equal to the integer times of the nominal pulse repetition frequency by a frequency dividing number,
wherein the initial synchronization acquiring device conducts phase shift for the peak search and the detailed synchronization acquisition by varying the frequency dividing number, and
wherein the initial synchronization acquiring device uses a signal having the carrier frequency of the transmitting signal as the signal having the frequency equal to the integer times of the nominal pulse repetition frequency.

10. The receiving apparatus according to claim 7,
wherein the peak search function has a function for estimating a frequency deviation between the carrier frequency of the transmitting signal and the oscillation frequency of a receiver from the frequency-converted signal divided into two quadrature signals, and rotates the phase by the complex multiplication of a complex number in accordance with the estimation result of the frequency deviation with the couple of signals divided into two quadrature signals.

11. The receiving apparatus according to claim 1,
wherein the initial synchronization acquiring device further comprises:
a function for conducting the sampling in a phase leading an original timing of sampling in the nominal pulse repetition frequency or the frequency of an integer times thereof;
a function for conducting the sampling in a phase delayed from the original timing;
a function for despreading the signals sampled with two phases with the spread signal in the transmitting signal;
a function for obtaining a difference from the two despread signals; and
a function for controlling the timings of the three samplings from the difference signal, and
wherein the peak search function and the detailed synchronization acquiring function input a signal obtained by synthesizing the signals sampled in the two phases and demodulate the signal obtained by synthesizing the signals sampled in the two phases.

12. A receiving apparatus for receiving a transmitting signal transmitted based on a communication system for exchanging information with an intermittent pulse train signal in a nominal pulse repetition frequency or an integer times thereof as a receiving signal, comprising:
an initial synchronization acquiring device for synchronizing a sampling timing of the receiving signal to a pulse location or a pulse phase before demodulation of the receiving signal,
wherein the initial synchronization acquiring device comprises
a peak search function that executes peak search processes including holding a largest output value as a peak value by searching all phases corresponding to the frequency of the transmitting signal, judging existence of the receiving signal from the peak value, and estimating a new peak phase estimated region from a region including the phase of the peak value and being narrower than all phase regions corresponding to the frequency when the receiving signal exists; and
a detailed synchronization acquiring function for conducting acquisition of a detailed synchronization in the peak phase estimated region estimated with the peak search function,
wherein the peak search function repeats said peak search processes until the peak phase estimated region becomes equal to or narrower than a pulse width of the transmitting signal.

13. The receiving apparatus according to claim 12,
wherein the peak search function comprises at least a function for changing an amplification coefficient for amplifying the received transmitting signal in the preceding stage of the peak search, and a function for changing the threshold value for judging existence of the peak phase, and changes the amplification factor or the threshold value in accordance with the largest peak value being held.

14. The receiving apparatus according to claim 12, further comprising:
an analog to digital converter for conducting analog-to-digital conversion in the nominal pulse period of the input pulse train or in the period of an integer times thereof; and
a timing signal generator for supplying a clock to give the conversion timing, wherein the input pulse is synchronized with the timing of the analog-to-digital conversion in the initial synchronization acquisition, and search resolution in the initial synchronization acquisition is raised by shifting the phase of timing in the conversion.

15. A communication apparatus comprising:

a transmitting function and a receiving function for exchanging information with an intermittent pulse train signal, wherein the receiving function includes an initial synchronization acquiring device for initial synchronization acquisition of the intermittent pulse train signal, and wherein the initial synchronization acquiring device comprises a peak search function which searches all phases among pulses in the predetermined search resolution, estimates a region where a peak phase having the largest output value of the intermittent pulse train signal exists, and narrows an estimated region of the peak phase until a predetermined range is obtained by repeating the search of all phases within the estimated region, wherein the predetermined range is equal to or narrower than a pulse width of the transmitting signal; and a detailed synchronization acquiring function for conducting synchronization acquisition of the peak phase in a search resolution higher than the search resolution in the peak search function within the narrowed estimating phase region.

16. The communication apparatus according to claim 15, wherein the peak search function comprises at least a function for changing, in the narrowing process, an amplification factor for amplifying the pulse train signal received in the preceding stage of the peak search, and the function for varying the threshold value for judging existence of the peak phase.

17. A control apparatus comprising:

an ultra-wideband (UWB) communication apparatus having a transmitting function and a receiving function, provided with an UWB receiver, an UWB transmitter, and a baseband unit, each of the UWB receiver and UWB transmitter includes a communication apparatus for exchanging information with an intermittent pulse train; and a processor, wherein the control apparatus further includes a function for transmitting the data obtained from sensors connected to the control apparatus to a central processing unit with an Ultra-Wideband Impulse Radio (UWB-IR) radio communication through an arithmetic process of the processor, wherein the receiving function of the UWB communication apparatus includes an initial synchronization acquiring device for initial synchronization acquisition of an input pulse, and wherein the initial synchronization acquiring devices comprises a peak search function which searches all phases among pulses in a predetermined search resolution, estimates a region where a peak phase having a largest output value of the input pulse train exists, and narrows the estimated region of the peak phase until a predetermined range can be obtained by repeating the search of all phases within the estimate region, wherein the predetermined range is equal to or narrower than a pulse width of the transmitting signal; and a detailed synchronization acquiring function for conducting, in the narrowed phase estimated region, the synchronization acquisition of peak phase in a search resolution higher than that of the peak search function.

18. The control apparatus according to claim 17, further comprising:

a function for transmitting a state of apparatuses mounted in an automobile detected by sensors to the mounted central processing unit by the UWB-IR radio communication by processing such state with the processor; and a function for controlling an actuator to drive the apparatuses through the arithmetic process with the processor by receiving a manipulation instruction to the apparatuses with the UWB-IR radio communication from the central processing unit.

* * * * *